United States Patent
Meda et al.

(10) Patent No.: US 12,358,343 B2
(45) Date of Patent: Jul. 15, 2025

(54) CLIMATIZATION AND WINDOW SYSTEM FOR MOBILE HOMES

(71) Applicant: Dometic Sweden AB, Solna (SE)

(72) Inventors: Samuele Meda, Chichester (GB); Anton Lundqvist, Älvsjö (SE)

(73) Assignee: Dometic Sweden AB, Solna (SE)

( * ) Notice: Subject to any disclaimer, the term of this patent is extended or adjusted under 35 U.S.C. 154(b) by 333 days.

(21) Appl. No.: 17/003,317

(22) Filed: Aug. 26, 2020

(65) Prior Publication Data

US 2021/0061060 A1    Mar. 4, 2021

(30) Foreign Application Priority Data

Aug. 28, 2019    (DE) .......................... 102019212949.8

(51) Int. Cl.
*B60H 1/00*    (2006.01)

(52) U.S. Cl.
CPC ..... *B60H 1/00535* (2013.01); *B60H 1/00207* (2013.01); *B60H 1/00364* (2013.01);
(Continued)

(58) Field of Classification Search
CPC ............ B60H 1/00535; B60H 1/00207; B60H 1/00364; B60H 1/00542; B60H 1/00664; B60H 2001/00235; B60H 2001/00721
(Continued)

(56) References Cited

U.S. PATENT DOCUMENTS

D226,381 S    2/1973    Harty, Jr.
D249,703 S    9/1978    Zimmerman et al.
(Continued)

FOREIGN PATENT DOCUMENTS

AU    2004202967    3/2011
AU    2007200788    9/2011
(Continued)

OTHER PUBLICATIONS

Lasco 15-1623 PVC Hose Adapter with 3/4-Inch Female Hose and 3/4-Inch . . . Mar. 4, 2014, https://www.amazon.com/LASCO-15-1623-Adapter-4-Inch-Connection/dp/B00ITPIG54. (Year: 2014).*
(Continued)

*Primary Examiner* — Allen R. B. Schult
*Assistant Examiner* — William C Weinert
(74) *Attorney, Agent, or Firm* — Dinsmore & Shohl LLP

(57) ABSTRACT

A modular climatization system for a recreational vehicle and includes a mounting frame and a window, the mounting frame is mountable into a roof cut-out of the recreational vehicle, thereby defining an opening in the roof, an outward facing side and an inward facing side of the mounting frame with respect to the recreational vehicle, and the window is mountable to the outward facing side of the mounting frame, the modular climatization system further comprises an air conditioning unit and an air distribution unit, the air conditioning unit being mountable to the outward facing side of the mounting frame, wherein the window and the air conditioning unit are mountable to the frame in a mutually exchangeable manner, and the air distribution unit being mountable to the inward facing side of the mounting frame.

28 Claims, 18 Drawing Sheets

(52) U.S. Cl.
CPC ..... B60H 1/00542 (2013.01); B60H 1/00664 (2013.01); *B60H 2001/00235* (2013.01); *B60H 2001/00721* (2013.01)

(58) Field of Classification Search
USPC ........................................................ 454/156
See application file for complete search history.

(56) References Cited

U.S. PATENT DOCUMENTS

| | | | |
|---|---|---|---|
| 4,154,213 A | 5/1979 | Winters | |
| 4,217,764 A | 8/1980 | Armbruster | |
| 4,508,126 A | 4/1985 | Everard | |
| D284,025 S | 5/1986 | Armstrong | |
| 4,628,702 A | 12/1986 | Boxum | |
| 4,641,502 A | 2/1987 | Aldrich | |
| 4,672,818 A * | 6/1987 | Roth | B60H 1/00535 62/298 |
| 4,709,623 A | 12/1987 | Roth | |
| 4,719,954 A | 1/1988 | Curtis et al. | |
| 4,729,227 A | 3/1988 | Peden | |
| 4,770,223 A | 9/1988 | Ouellette | |
| D300,777 S | 4/1989 | Bales | |
| D306,341 S | 2/1990 | Bales | |
| 4,924,895 A | 5/1990 | Bailie | |
| 4,996,850 A | 3/1991 | Boxum et al. | |
| 5,002,111 A | 3/1991 | Boiteau | |
| D318,218 S | 7/1991 | Ouellette | |
| 5,309,972 A | 5/1994 | Thomas | |
| 5,423,506 A | 6/1995 | Spoon | |
| 5,531,641 A | 7/1996 | Aldrich | |
| D376,007 S | 11/1996 | Thomas | |
| 5,672,101 A | 9/1997 | Thomas | |
| 5,697,417 A | 12/1997 | Spoon | |
| D391,632 S | 3/1998 | Thomas | |
| 5,848,536 A | 12/1998 | Dodge | |
| 5,897,435 A | 4/1999 | Thomas et al. | |
| D424,184 S | 5/2000 | Chang-Kwon | |
| 6,101,829 A | 8/2000 | Robinson | |
| 6,134,909 A | 10/2000 | Lyu | |
| 6,149,513 A | 11/2000 | Lyu | |
| D435,639 S | 12/2000 | Slavonia et al. | |
| 6,161,609 A | 12/2000 | Ahn | |
| 6,196,914 B1 | 3/2001 | Lyu | |
| 6,213,197 B1 | 4/2001 | Ebbeson | |
| 6,263,689 B1 | 7/2001 | Dodge | |
| 6,302,780 B1 | 10/2001 | Ahn et al. | |
| 6,339,934 B1 | 1/2002 | Yoon et al. | |
| 6,357,249 B1 | 3/2002 | Robinson et al. | |
| 6,370,899 B1 | 4/2002 | Hobbs et al. | |
| 6,437,524 B1 | 8/2002 | Dimanstein | |
| D463,541 S | 9/2002 | Thomas | |
| 6,449,973 B2 | 9/2002 | Dodge | |
| 6,536,222 B1 | 3/2003 | Ahn et al. | |
| 6,571,572 B2 | 6/2003 | Hobbs et al. | |
| D495,041 S | 8/2004 | Thomas | |
| 6,857,953 B2 | 2/2005 | Malott | |
| 7,004,832 B2 | 2/2006 | Thomas | |
| 7,131,705 B1 | 11/2006 | Delvecchio et al. | |
| 7,140,192 B2 | 11/2006 | Allen | |
| 7,171,822 B2 | 2/2007 | Allen | |
| 7,184,254 B2 | 2/2007 | Dimanstein | |
| D538,413 S | 3/2007 | Lyu et al. | |
| 7,234,315 B2 | 6/2007 | Allen | |
| 7,237,397 B2 | 7/2007 | Allen | |
| 7,316,119 B2 | 1/2008 | Allen | |
| 7,419,368 B2 | 9/2008 | Milks | |
| D588,479 S | 3/2009 | Giese | |
| 7,739,882 B2 | 6/2010 | Evans | |
| D629,094 S | 12/2010 | Thomas | |
| 7,931,323 B1 | 4/2011 | Del Vecchio | |
| 7,963,117 B2 | 6/2011 | Allen | |
| 8,019,478 B2 | 9/2011 | Whitehurst et al. | |
| 8,056,351 B2 | 11/2011 | Marciano | |
| D661,386 S | 6/2012 | Bergin | |
| 8,240,168 B2 | 8/2012 | Holguin | |
| D679,796 S | 4/2013 | Thomas | |
| 8,440,143 B2 | 5/2013 | Liptak | |
| 8,535,127 B2 | 9/2013 | Malott | |
| 8,568,209 B2 | 10/2013 | Boxum | |
| 8,744,632 B2 | 6/2014 | Blackshaw et al. | |
| D712,531 S | 9/2014 | Bergin | |
| D715,907 S | 10/2014 | Bergin | |
| D716,925 S | 11/2014 | Bergin | |
| 9,243,447 B2 | 1/2016 | Macdonald | |
| 9,540,873 B1 | 1/2017 | Townsley | |
| 9,631,832 B2 | 4/2017 | Malott | |
| D785,771 S | 5/2017 | Bergin | |
| D785,772 S | 5/2017 | Bergin | |
| 9,651,284 B2 | 5/2017 | Esch | |
| D795,712 S | 8/2017 | Bergin | |
| 9,725,949 B2 | 8/2017 | Townsley | |
| D811,566 S | 2/2018 | Liu | |
| D817,466 S | 5/2018 | Moseley | |
| 9,975,405 B2 | 5/2018 | Siddiqui | |
| D824,499 S | 7/2018 | Williamson | |
| 10,082,345 B1 | 9/2018 | Mihail | |
| 10,093,152 B2 | 10/2018 | Allard | |
| D841,138 S | 2/2019 | Williamson | |
| D850,609 S | 6/2019 | Bergin | |
| D862,668 S | 10/2019 | Moseley | |
| D865,926 S | 11/2019 | Moseley | |
| 10,502,445 B2 | 12/2019 | Matambo et al. | |
| 10,589,593 B2 | 3/2020 | Westendarp | |
| D884,870 S | 5/2020 | Bergin | |
| 10,675,941 B2 | 6/2020 | Williamson | |
| 10,696,129 B2 | 6/2020 | Bergin | |
| D905,217 S | 8/2020 | Hederstiema | |
| D907,183 S | 1/2021 | Meda | |
| 10,941,955 B2 | 3/2021 | Heral | |
| D915,569 S | 4/2021 | Meda | |
| D917,036 S | 4/2021 | Hederstierna | |
| 11,034,208 B2 * | 6/2021 | Williamson | B60H 1/00364 |
| D932,610 S | 10/2021 | Pozzi et al. | |
| 2002/0184909 A1 | 12/2002 | Hobbs et al. | |
| 2003/0218854 A1 | 11/2003 | Dimanstein | |
| 2005/0003751 A1 | 1/2005 | Thomas | |
| 2006/0052050 A1 | 3/2006 | Malott | |
| 2007/0227693 A1 | 10/2007 | Allen | |
| 2008/0202138 A1 | 8/2008 | Pabisz | |
| 2009/0209193 A1 | 8/2009 | Kloster | |
| 2010/0268397 A1 | 10/2010 | Whitehurst et al. | |
| 2013/0015173 A1 | 1/2013 | Robinson | |
| 2013/0153196 A1 | 6/2013 | Blackshaw et al. | |
| 2013/0205811 A1 | 8/2013 | Esch | |
| 2014/0096920 A1 | 4/2014 | Macdonald | |
| 2014/0158312 A1 | 6/2014 | Townsley | |
| 2014/0223928 A1 | 8/2014 | Esch | |
| 2014/0260393 A1 | 9/2014 | Siddiqui et al. | |
| 2015/0035437 A1 | 2/2015 | Panopoulos et al. | |
| 2015/0204600 A1 | 7/2015 | Fay et al. | |
| 2016/0176149 A1 | 6/2016 | Manderfeld et al. | |
| 2016/0200174 A1 | 7/2016 | Tremer et al. | |
| 2017/0210205 A1 * | 7/2017 | Mosby | B60P 3/36 |
| 2017/0284906 A1 | 10/2017 | Xing et al. | |
| 2017/0335624 A1 | 11/2017 | Townsley | |
| 2018/0147913 A1 | 5/2018 | Bergin | |
| 2018/0265043 A1 | 9/2018 | Salter et al. | |
| 2018/0335220 A1 | 11/2018 | Matambo et al. | |
| 2018/0370339 A1 * | 12/2018 | Bacon | B60J 1/2088 |
| 2019/0047353 A1 | 2/2019 | Williamson | |
| 2019/0047354 A1 | 2/2019 | Williamson | |
| 2019/0047380 A1 | 2/2019 | Snider | |
| 2019/0061829 A1 * | 2/2019 | Fleckenstein | B62D 25/06 |
| 2019/0128551 A1 | 5/2019 | Heral | |
| 2019/0315197 A1 | 10/2019 | Williamson | |
| 2020/0064008 A1 | 2/2020 | Matambo | |
| 2020/0148028 A1 | 5/2020 | Westendarp | |
| 2020/0198438 A1 | 6/2020 | Liu | |
| 2020/0298655 A1 | 9/2020 | Williamson | |
| 2020/0338951 A1 | 10/2020 | Paci | |
| 2021/0031593 A1 * | 2/2021 | Kennedy | B60H 1/0045 |
| 2021/0061054 A1 | 3/2021 | Meda | |

(56) References Cited

U.S. PATENT DOCUMENTS

| | | | |
|---|---|---|---|
| 2021/0061058 A1 | 3/2021 | Meda | |
| 2021/0061060 A1 | 3/2021 | Meda | |
| 2021/0276396 A1* | 9/2021 | Jurek | F24F 13/078 |

FOREIGN PATENT DOCUMENTS

| | | |
|---|---|---|
| AU | 2007237183 | 12/2012 |
| AU | 2009233601 | 1/2013 |
| AU | 2007202766 | 11/2013 |
| AU | 354553 | 3/2014 |
| AU | 2012261549 | 8/2015 |
| AU | 367405 | 3/2016 |
| AU | 201612249 | 3/2016 |
| AU | 201613590 | 7/2016 |
| AU | 201613591 | 7/2016 |
| AU | 201613592 | 7/2016 |
| AU | 201613593 | 7/2016 |
| AU | 2016101949 | 12/2016 |
| AU | 2017100215 | 3/2017 |
| AU | 201712794 | 5/2017 |
| AU | 201712798 | 5/2017 |
| AU | 2017200186 | 8/2017 |
| AU | 201810968 | 3/2018 |
| AU | 201810969 | 3/2018 |
| AU | 201810970 | 3/2018 |
| AU | 201810971 | 3/2018 |
| AU | 201810972 | 3/2018 |
| AU | 201810973 | 3/2018 |
| AU | 201810975 | 3/2018 |
| AU | 201810977 | 3/2018 |
| AU | 201810978 | 3/2018 |
| AU | 201816419 | 1/2019 |
| AU | 201910037 | 2/2019 |
| AU | 201910038 | 2/2019 |
| AU | 201911094 | 4/2019 |
| AU | 201912125 | 6/2019 |
| AU | 2017364256 | 6/2019 |
| AU | 2019202512 | 10/2019 |
| AU | 201915241 | 12/2019 |
| AU | 201916406 | 12/2019 |
| AU | 201916408 | 12/2019 |
| AU | 201916409 | 12/2019 |
| AU | 2018366469 | 5/2020 |
| AU | 202016120 | 1/2021 |
| AU | 202016121 | 1/2021 |
| AU | 202016122 | 1/2021 |
| AU | 202016123 | 1/2021 |
| CA | 2518348 | 3/2006 |
| CA | 2578651 | 8/2007 |
| CA | 2587994 | 12/2007 |
| CA | 2611822 | 5/2008 |
| CA | 2686403 | 5/2010 |
| CA | 2906348 | 9/2014 |
| CA | 2951956 | 12/2015 |
| CA | 2954152 | 1/2016 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CA | 2967169 C | 8/2022 |
| CN | 103237671 A | 8/2013 |
| CN | 103687735 A | 3/2014 |
| CN | 204870448 U | 12/2015 |
| CN | 106059556 A | 10/2016 |
| CN | 106470856 A | 3/2017 |
| CN | 304097003 S | 4/2017 |
| CN | 106976376 A | 7/2017 |
| CN | 109070688 A | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110293813 A | 10/2019 |
| CN | 110385958 A | 10/2019 |
| CN | 305397384 S | 10/2019 |
| CN | 111344168 A | 6/2020 |
| CN | 213237518 | 5/2021 |
| CN | 213237945 | 5/2021 |
| DE | 9311066 U1 | 3/1994 |
| DE | 19654261 | 6/1998 |
| DE | 69503723 | 9/1998 |
| DE | 19730136 | 1/1999 |
| DE | 69817899 | 10/2003 |
| DE | 10255833 | 6/2004 |
| DE | 10336767 | 12/2004 |
| DE | 59812376 | 1/2005 |
| DE | 202004007924 | 11/2005 |
| DE | 202005013530 | 12/2005 |
| DE | 202004017266 | 4/2006 |
| DE | 202005000560 | 6/2006 |
| DE | 102005030362 | 11/2006 |
| DE | 602004004480 | 3/2007 |
| DE | 202006001374 | 7/2007 |
| DE | 202006001376 | 7/2007 |
| DE | 202006001377 | 7/2007 |
| DE | 202006009803 | 12/2007 |
| DE | 202007012195 U1 | 12/2007 |
| DE | 202007006292 | 10/2008 |
| DE | 102007038716 | 2/2009 |
| DE | 602005012194 | 2/2009 |
| DE | 202008003123 | 9/2009 |
| DE | 102008028066 | 12/2009 |
| DE | 602007009584 | 11/2010 |
| DE | 502007006725 | 4/2011 |
| DE | 202011051110 U1 | 10/2011 |
| DE | 202011101256 | 12/2011 |
| DE | 202010012578 | 2/2012 |
| DE | 202011002986 | 7/2014 |
| DE | 202013004158 | 9/2014 |
| DE | 102016220768 | 4/2018 |
| DE | 102017214863 A1 | 10/2018 |
| DE | 112017000915 | 10/2018 |
| DE | 102017207797 | 11/2018 |
| DE | 102017214941 | 2/2019 |
| DE | 1020172214941 A1 | 2/2019 |
| DE | 102017219353 | 5/2019 |
| DE | 112017005541 | 8/2019 |
| DE | 102018204532 | 9/2019 |
| DE | 102018206490 | 10/2019 |
| DE | 102019205194 | 10/2019 |
| DE | 102018206854 | 11/2019 |
| DE | 112018003284 | 3/2020 |
| DE | 202015009786 | 3/2020 |
| DE | 212018000248 | 3/2020 |
| DE | 212018000249 | 3/2020 |
| DE | 112018003288 | 4/2020 |
| DE | 102018222877 | 6/2020 |
| DE | 102018222877 A1 | 6/2020 |
| DE | 112018005002 | 7/2020 |
| DE | 112018005883 | 7/2020 |
| EP | 700801 | 3/1996 |
| EP | 869018 | 10/1998 |
| EP | 892225 | 1/1999 |
| EP | 1538009 | 6/2005 |
| EP | 1634740 | 3/2006 |
| EP | 1721765 | 11/2006 |
| EP | 1752717 | 2/2007 |
| EP | 1752717 A1 * | 2/2007 ............ F24F 13/06 |
| EP | 1826041 | 8/2007 |
| EP | 1870270 | 12/2007 |
| EP | 1925889 | 5/2008 |
| EP | 1955946 | 8/2008 |
| EP | 1988612 | 11/2008 |
| EP | 2189312 | 5/2010 |
| EP | 2192040 | 6/2010 |
| EP | 2196390 | 6/2010 |
| EP | 2433658 | 3/2012 |
| EP | 2665611 | 10/2014 |
| EP | 2178710 | 11/2015 |
| EP | 2616258 | 2/2016 |
| EP | 3113965 | 1/2017 |
| EP | 3241695 | 4/2018 |

(56) References Cited

FOREIGN PATENT DOCUMENTS

| | | | | |
|---|---|---|---|---|
| EP | 2714440 | 5/2018 | | |
| EP | 2994326 | 7/2018 | | |
| EP | 3401619 | 11/2018 | | |
| EP | 3411250 | 12/2018 | | |
| EP | 3476630 | 5/2019 | | |
| EP | 3543047 | 9/2019 | | |
| EP | 3564564 | 11/2019 | | |
| JP | 2008290694 A * | 12/2008 | ......... | B60H 1/00371 |
| KR | 1020130142766 A | 12/2013 | | |
| KR | 2098632 B1 * | 4/2020 | ......... | B60H 1/00207 |
| WO | 2009021994 | 2/2009 | | |
| WO | 2012034695 A1 | 3/2012 | | |
| WO | 2012113538 A1 | 8/2012 | | |
| WO | 2012159749 A1 | 11/2012 | | |
| WO | 2014143181 A1 | 9/2014 | | |
| WO | 2014180559 A1 | 11/2014 | | |
| WO | WO-2015131235 A1 * | 9/2015 | ......... | B60H 1/00364 |
| WO | 2017143393 A1 | 8/2017 | | |
| WO | 2017143394 A1 | 8/2017 | | |
| WO | 2018096127 A1 | 5/2018 | | |
| WO | 2019038023 A1 | 2/2019 | | |
| WO | 2019082168 | 5/2019 | | |
| WO | 2019097448 A1 | 5/2019 | | |
| WO | 2019207451 | 10/2019 | | |
| WO | 2019229706 | 12/2019 | | |
| WO | 2019244011 | 12/2019 | | |
| WO | 2020143636 | 7/2020 | | |
| WO | 2020151541 | 7/2020 | | |
| WO | 2020188485 | 9/2020 | | |
| WO | 2020192746 | 10/2020 | | |
| WO | 2021074841 | 4/2021 | | |

OTHER PUBLICATIONS

Oliver, Bill. "How to Install a Window AC Unit in a Travel Trailer." YouTube, YouTube, Jun. 25, 2019, https://www.youtube.com/watch?v=4inORCVktaE. (Year: 2019).*
Non-Final Office Action issued in U.S. Appl. No. 17/003,309 mailed on Aug. 23, 2022.
Office Action issued in DE Patent Application No. 102019212946.3 mailed on Aug. 10, 2022.
Office Action issued in DE Patent Application No. 102019212947.1 mailed on Nov. 17, 2022.
10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone CD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
Dirna Bergstrom: Slim Cool; http://www.dirna.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140, Feb. 23, 2013.
Dometic Group: "Climate Control", http://www.dometic.com/enus/Americas/USA/RV-Products/climate, 2 pages.
Dometic Waeco Coolair RT 880; http://www.dometic.co.uk/product/waeco-coolair-rt-880-2/ May 14, 2015.
Eberspacher Cooltronic Parking Coolers with High Efficiency with the Engine OFF; http://www.eberspacher.com/products/air-conditioning/cooltronic-truck-parking-coolers.html Jun. 23, 2015.
Indelb; WO Oblo; Sleeping Well Oblo; http://www.indelb.com/products/parking_air_cooler/sleeping_well/sw_oblo Jan. 1, 2016.
Webasto: Rooftop air conditioning systems: Rooftop 3.5 - 9.9 kw; https://web.archive.org/web/20161201014045/https://www.webasto.com/au/markets-products/off-highway/air-conditioning/rooftop-air-conditioning/rooftop-ac-35-99-kw/.
Webasto; Truck parking cooler: Cool Top Vario 10 E; http://www.webasto.com/GB/marketsproducts/truck/air-conditioning/products/cool-top-vario/ Apr. 25, 2016.
Youtube; Viesa Kompressor; https://www.youtube.com/watch?v=SPK17XEVVLO May 22, 2012 (https://www.google.com/?gws_rd=ssl#q=https://www.youtube.com/watch?v%3DSPK17XEvVL0&spf=1495819902591).
Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
Design U.S. Appl. No. 29/760,605, filed Dec. 2, 2020.
U.S. Appl. No. 17/252,506, filed Dec. 15, 2020.
U.S. Appl. No. 63/141,800, filed Jan. 26, 2021.
Design U.S. Appl. No. 29/767,929, filed Jan. 26, 2021.
Design U.S. Appl. No. 29/774,535, filed Mar. 17, 2021.
U.S. Appl. No. 17/205,719, filed Mar. 18, 2021.
U.S. Appl. No. 63/175,304, filed Apr. 1, 2021.
DE Patent Application No. 102019219449.8 Filed Aug. 28, 2019 entitled "Mini Heki Upgrade Kit".
DE Patent Application No. 102019212946.3 Filed on Aug. 28, 2019 entitled "Modular Sensors—Mini Heki Upgrade Kit".
DE Patent Application No. 102019212947.1 Filed on Aug. 28, 2019 entitled "Connection Hub—Mini Heki Upgrade Kit".
DE Office Action Issued in Patent Application No. 102019212946.3 Mailed on Nov. 11, 2019.
DE Office Action Issued in Patent Application No. 102019212947.1 Mailed on Nov. 11, 2019.
DE Office Action Issued in Patent Application No. 102019212947.1 Mailed on Jun. 17, 2020.
Office Action Issued in DE Patent Application No. 102019219449.8 mailed on Apr. 19, 2021.
U.S. Appl. No. 16/384,376, filed Apr. 15, 2019 titled Air Distribution Apparatus.
U.S. Appl. No. 17/003,309, filed Aug. 26, 2020 titled Component of Climatization System or Window System.
U.S. Appl. No. 17/003,310, filed Aug. 26, 2020 titled Air Conditioning Unit.
U.S. Appl. No. 17/003,317, filed Aug. 26, 2020 titled Climatization and Window System for Mobile Homes.
U.S. Appl. No. 17/049,731, filed Oct. 22, 2020 titled Damped Mobile Compressor.
Design U.S. Appl. No. 29/594,476, filed Feb. 17, 2017 titled Shroud Assembly.
Design U.S. Appl. No. 29/604,433, filed May 17, 2017 titled Air Conditioning Apparatus.
Design U.S. Appl. No. 29/645,887, filed Apr. 30, 2018 titled Mobile Air Conditioner.
Design U.S. Appl. No. 29/660,094, filed Aug. 17, 2018 titled Air Distribution Box.
Design U.S. Appl. No. 29/715,592, filed Dec. 3, 2019 titled Filter Housing.

(56) References Cited

OTHER PUBLICATIONS

Design U.S. Appl. No. 29/758,314, filed Nov. 13, 2020 titled Air Conditioning Apparatus.
Dometic Product Catalog—Climate Control. 2015.
Dometic Product Catalog—Climate Control. 2016.
Examination Report Issued in DE Patent Application No. 102019212946.3 mailed on Apr. 9, 2021.
Non-Final Office Action issued in U.S. Appl. No. 17/003,309 mailed on Mar. 14, 2023.
Notice of Allowance issued in U.S. Appl. No. 17/003,310 mailed on May 2, 2023.
Patent Certificate issued in DE Patent Application No. 102019212946.3 mailed on Mar. 30, 2023.
Patent Certificate issued in DE Patent Application No. 102019212949.8 mailed on Apr. 27, 2023.
Corrected Notice of Allowability issued in U.S. Appl. No. 17/003,310 mailed on Jul. 19, 2023.
U.S. Appl. No. 18/449,294 titled "Structure Which Moves Wire from Exterior to Interior of a Vehicle" filed Aug. 14, 2023.
Final Office Action issued in U.S. Appl. No. 17/003,309 mailed on Dec. 1, 2023.
PCT Application No. PCT/IB2024/057864 titled "Structure Which Moves Wire From Exterior to Interior of a Vehicle" filed on Aug. 13, 2024.
Non-Final Office Action issued in U.S. Appl. No. 17/003,309 mailed on Jun. 28, 2024.
Design U.S. Appl. No. 29/951,603 titled "Fan Housing and Cover" filed Jul. 10, 2024.
Ex-Parte Quayle Action issued in U.S. Appl. No. 17/003,310 mailed on Dec. 23, 2022.
Decision of Grant issued in DE Patent Application No. 102019212946.3 mailed on Dec. 19, 2022.
Decision of Grant issued in DE Patent Application No. 102019212949.8 mailed on Jan. 16, 2023.

* cited by examiner

CLIMATIZATION AND WINDOW SYSTEM FOR MOBILE HOMES

CLAIM TO PRIORITY

This non-provisional patent application claims priority to and benefit of, under 35 U.S.C. § 119(a), German Patent Application Serial Number DE 102019212949.8, filed Aug. 28, 2019, all of which is incorporated by reference herein.

BACKGROUND

The present embodiments relate to a modular climatization system for a mobile home or recreational vehicle or the like with a window and an air conditioning unit, an air conditioning unit suitable for the system and a method of exchanging the window with the air conditioning unit.

Windows, especially roof-top windows in recreational vehicles, like mobile homes, are widely known. Typically, those windows can be opened by pivoting the window from inside the recreational vehicle to the outside of the vehicle. These windows are mounted with windows frames in the roof of the recreational vehicle. Additionally, inside the recreational vehicle there is usually a shading unit with blinds to control the amount of incident light.

Furthermore, if recreational vehicles are used for journeys in regions with high ambient temperature, powerful air conditioning units are also widely used and, as the roof-top windows, the air conditioning unit is typically mounted on the roof of the recreational vehicle. For appropriately distributing the cooled air inside the recreational vehicle, usually an air distribution unit supplements such climatization or air conditioning systems. The air distribution unit is located inside the recreational vehicle. Usually, the air distribution unit covers an opening in the roof from the inside whereas the air conditioning unit is placed outside the recreational vehicle and covers the opening.

For both the window and the air conditioning unit there may not always be enough space at the ceiling of the recreational vehicle, which may be due to furniture inside the recreational vehicle. Furthermore, the air conditioning unit is often not used for most of the year. Using only one opening in the roof of the recreational vehicle for both systems and replacing alternatingly one with the other, represents a repeatedly high mounting effort.

The present embodiments address this problem and aims to provide a solution to this problem. As such, the present embodiments provide a modular climatization system for a recreational vehicle having a mounting frame and a window. The mounting frame defines and lies in a plane and is mountable into a roof cut-out of the recreational vehicle, thereby defining an opening in the roof of the recreational vehicle, an outward facing side and an inward facing side of the mounting frame with respect to the recreational vehicle, and the window is mountable to the outward facing side of the mounting frame.

SUMMARY

The modular climatization system comprises an air conditioning unit and an air distribution unit. The air conditioning unit being mountable to the outward facing side of the mounting frame, wherein the window and the air conditioning unit are mountable to the frame in a mutually exchangeable manner, and the air distribution unit being mountable to the inward facing side of the mounting frame.

With the modular climatization system, a quick and easy exchange of the window with the air conditioning unit, and vice versa, is possible, while both, the window and the air conditioning unit share the same mounting frame. The modular climatization system according to the present embodiments is space saving in view of two separate systems for a window and air conditioning known from the art and is, furthermore, more efficient also in an economic point of view.

The mounting frame preferably is configured to provide a sealed fit with the roof of the recreational vehicle, whereby the term "sealed" means water-tight or air-tight and, preferably, both.

According to some embodiments, the modular climatization system further comprises a fan module for forced ventilation mountable to the outward facing side of the mounting frame. The window, the air conditioning unit and the fan module are mountable to the frame in a mutually exchangeable manner. As such there is even provided a triple modular system.

According to some embodiments, the modular climatization system further comprises a shading unit mountable to the inward facing side of the mounting frame, wherein the air distribution unit and the shading unit are mountable to the frame in a mutually exchangeable manner. Analogously, to the air conditioning unit and the window, the air distribution unit and the shading unit are easily exchangeable while using the same mounting frame.

According to some embodiments, the mounting frame comprises securing structure for securing the air conditioning unit from moving with respect to the mounting frame in a direction within the plane of the mounting frame. The securing structure includes a first wall part that is arranged at least in part around the opening and projects in a direction substantially perpendicular to the plane of the mounting frame. As such, a reliable securing of the air conditioning unit from moving in the direction of the plane of the roof surface is achieved by simply plugging the air conditioning unit from above onto the mounting frame According to some embodiments, the first wall part is arranged completely around the opening. This provides for a more reliable securing.

According to some embodiments, the securing structure includes a second wall part that is arranged in parallel to the first wall part. This further enhances the securing of the air conditioning unit.

According to some embodiments, the first wall part and the second wall part are concentrically arranged around the opening. This even further enhances the securing of the air conditioning unit.

According to some embodiments, the air conditioning unit has at least one abutting portion that is configured to abut against the first wall part and/or the second wall part of the mounting frame in a direction within the plane of the mounting frame, in a mounted state. The abutting portion or portions thereby represent the counterpart to the wall parts of the mounting frame, which enhances the securing of the air conditioning unit.

According to some embodiments, the mounting frame is equipped with a cabling for providing electricity to at least the air conditioning unit. This provides an easy access to power the air conditioning unit. The power is provided from the mounting frame to the air conditioning unit via electric contact elements at both the mounting frame and the air conditioning unit, which contact elements do not require any screwing.

According to some embodiments, the air conditioning unit comprises means for air conditioning and heating. As such the air conditioning unit is useful also in regions with rather cold ambient temperature or climate.

According to some embodiments, the air conditioning unit has a cavity on its bottom side. The cavity, in a mounted state, faces the mounting frame for accommodating and encloses the outward facing side of the mounting frame that projects to the above from the outer roof surface of the recreational vehicle from above. The cavity provides for the quick fit between the air conditioning unit and the mounting frame. The above-mentioned abutting portions, if present, are located in or form part of the cavity and, as such, the first and second wall parts at the mounting frame, if present, fit within the cavity.

According to some embodiments, the air conditioning unit further comprises a gasket on its bottom side. The gasket surrounds the cavity and is configured to provide for a sealing with the outer roof surface of the recreational vehicle. This prevents dirt, water or moisture from entering the system as well as the interior of the recreational vehicle.

According to some embodiments, the air distribution unit can be fixed to the air conditioning unit via corresponding fixing means at the air distribution unit and at the air-conditioning unit, thereby clamping the mounting frame between the air distribution unit and the air conditioning unit. As such, the air distribution unit and the air conditioning unit are indirectly fixed to the mounting frame which eases the mounting procedure.

According to some embodiments, the fixing means at the air distribution unit and at the air conditioning unit are located in the area of the opening. As such, no further adaption of the roof, like the provision of bores outside the area of the opening, is necessary.

The kind of fixing means between the air distribution unit and the air conditioning unit is not particularly limited. According to some embodiments, the fixing means at the air distribution unit and at the air conditioning unit comprise bores. Thereby, in a mounted state, the air distribution unit is fixed to the air conditioning unit via the bores by bolts or screws. This provides for an easy and safe fastening. As alternative or additional fixing means, the air distribution unit and the air conditioning unit are fixed together by a plug and click fixing which provides, in its broadest sense, a snap-in connection so that no further components like bolts or screws are required for connecting the air distribution unit and the air conditioning unit.

According to some embodiments, no further fixing means are comprised by the modular climatization system for fixing the air conditioning unit or the air distribution unit to the mounting frame. As such, the mounting frame is only sandwiched between the air distribution unit and the air conditioning unit. This eases the mounting procedure.

According to some embodiments, the air conditioning unit comprises a first pipe section located at the bottom side of the air conditioning unit in the area of the opening and, in a mounted state, projecting vertically downwards to the air distribution unit to provide an air flow path to the air distribution unit. This provides for an efficient air flow. Preferably, in the respective air flow path, air is blown out from the air conditioning unit.

According to some embodiments, the air conditioning unit comprises a base plate on its bottom side. The first pipe section is integrally formed with the base plate and projects, in a mounted state, vertically downwards from the base plate. As such, the respective component can be easily manufactured by injection molding.

According to some embodiments, the air distribution unit comprises a second pipe section. The second pipe section is configured to fit with the first pipe section, either via an adapter in between the first and second pipe section or directly, in a telescopic manner, thereby forming part of the air flow path. As such, a sufficiently airtight air flow path can be realized without the need of further fastening and sealing the first and second pipe section with one another.

According to some embodiments, the first pipe section and the second pipe section directly fit and can be moved telescopically with respect to each other, so that the distance between the air conditioning unit and the air distribution unit is variable depending on the thickness of the roof of the recreational vehicle the modular climatization system is to be mounted on. This represents a cost-efficient way of establishing the air flow path with the two pipe section. Preferably, by means of the possible telescopic moving, a range of the roof thickness between 25 mm and 60 mm can be covered without the need of any additional components, like adapter means.

According to some embodiments, the first pipe section is smaller than the second pipe section. Thus, when the first pipe section and the second pipe section engage with each other, the second pipe section encloses the first pipe section. At the bottom side of the air conditioning unit, a recess is formed at a transition between the base plate and the first pipe section, the recess surrounds the first pipe section and is dimensioned so that the second pipe section can be inserted into the recess. This increases the lateral stability of the connection since the base plate contributes to it.

According to some embodiments, the first pipe section and the second pipe section fit with each other via the adapter. The adapter comprises a third pipe section that directly fits with the first pipe section at the air conditioning unit, and a fourth pipe section that directly fits with the second pipe section at the air distribution unit, thereby forming part of the air flow path. The adapter represents an effective and simple solution in case the air flow path in the air conditioning unit is of a different dimension than that of the air distribution unit. With the adapter, the above described telescopic movement can also be provided and a greater range of roof thickness can be covered.

According to some embodiments, the adapter comprises an air stream divider dividing the air flow path in at least two separate air flow paths. This minimizes turbulences inside the air flow path and provides for a smooth distribution of air inside the recreational vehicle.

According to some embodiments, the air stream divider is located in a region downstream the air flow path. As such, the division of the air flow path takes places within the air distribution unit and the divided flow paths can proceed in a predominantly horizontal direction so air smoothly exits the air distribution unit.

According to some embodiments, in a mounted state, the air distribution unit covers the inward facing side of the mounting frame. This has advantages not only for esthetic reasons. As such, the air distribution unit can laterally abut against the inward facing side of the mounting frame which contributes to the overall stability of the system.

According to some embodiments, the air distribution unit comprises a plurality of air deflecting elements. This provides for an appropriate air distribution inside the recreational vehicle.

According to some embodiments, the air conditioning unit and/or the window and/or, if present, the fan module includes an antenna located underneath an outer cover of the air conditioning unit and/or underneath the window and/or underneath an outer cover of the fan module, respectively. The antenna is thus mounted to a component of the modular climatization system that is arranged outside the vehicle for providing a good transmission signal. Since the air conditioning unit, the window and the fan module are mutually exchangeable, preferably each of them include the antenna. The antenna is not visible from outside the vehicle, except, however, in case of the window which may be predominantly transparent and, therefore, the antenna being located somewhere between the window and the roof of the vehicle might be visible through a transparent part of the window. The antenna can be connected with a receiver located inside the vehicle or somewhere else.

According to another aspect, the present embodiments provides an air conditioning unit mountable on the roof of a recreational vehicle. The air conditioning unit comprises a gasket and means for providing at least one air flow path both located on the bottom side of the air conditioning unit. The bottom side, in a mounted state, faces the roof. The gasket is configured to provide for a sealing with the outer roof surface of the recreational vehicle and the gasket is circumferential and encloses an area through which the air flow path passes. Finally, according to the present embodiments the air conditioning unit is configured to being used with the modular climatization system. The air conditioning unit according to the present embodiments can thereby be easily mounted to and dismounted from the roof of the recreational vehicle and provides for a secure fastening at the same time.

The air conditioning unit has a cavity on its bottom side and within the area enclosed by the gasket. The cavity is configured to accommodate and enclose from above an outward facing side of a mounting frame that is mounted into a roof cut-out of the recreational vehicle, thereby defining an opening in the roof of the recreational vehicle, the cavity is circumferential and encloses an area through which the air flow path passes. The advantages are the same as those in connection with the corresponding preferred features of the above climatization system.

The air conditioning unit has at least one abutting portion within the cavity that is configured to abut against a wall part of the mounting frame for securing the air conditioning unit from moving with respect to the mounting frame in a direction within a plane defined by the mounting frame which plane is substantially plane-parallel to the outer roof surface of the recreational vehicle.

The means for providing at least one air flow path comprise a first pipe section that, in a mounted state, projects vertically downwards. The advantages are the same as those in connection with the corresponding preferred features of the above climatization system.

The air conditioning unit comprises a base plate on its bottom side and the first pipe section is integrally formed with the base plate and projects, in a mounted state, vertically downwards from the base plate. The advantages are the same as those in connection with the corresponding preferred features of the above climatization system.

A recess is formed at a transition between the base plate and the first pipe section, the recess surrounds the first pipe section and has a certain depth and width. The advantages are the same as those in connection with the corresponding preferred features of the above climatization system.

The air conditioning unit includes an antenna located underneath an outer cover of the air conditioning unit as it is already described above with respect to a preferred embodiment of the modular climatization system.

According to another aspect, the present embodiments provide a method of exchanging the window with the air conditioning unit of the modular climatization system according to the invention, the window being coupled to the mounting frame, wherein the method comprises the following steps:
removing the window from the mounting frame,
placing the air conditioning unit onto the outward facing side of the mounting frame,
placing the air distribution unit over the inward facing side of the mounting frame and
fixing the air distribution unit from the inside and through the opening defined by the mounting frame to the air conditioning unit via fixing means.

The inventive method enables a quick and easy exchange of the components while using the same mounting frame.

The method according to the present embodiments further comprises the step of electronically connecting the air distribution unit with the air conditioning unit. As such, the air conditioning unit can be controlled from inside the recreational vehicle via the air distribution unit.

The fixing means comprise bores at the air distribution unit and at the air conditioning unit and the step of fixing the air distribution unit to the air conditioning unit includes fastening the air distribution unit to the air conditioning unit by bolts or screws via the bores. This provides for a save and efficient fastening.

BRIEF DESCRIPTION OF THE DRAWINGS

In the following, embodiments of the present invention will be further illustrated while referring to the attached figures, in which FIG. 7 illustrates a side view of a mounted mounting frame as shown in

FIG. 3,

DETAILED DESCRIPTION

Figure 1:
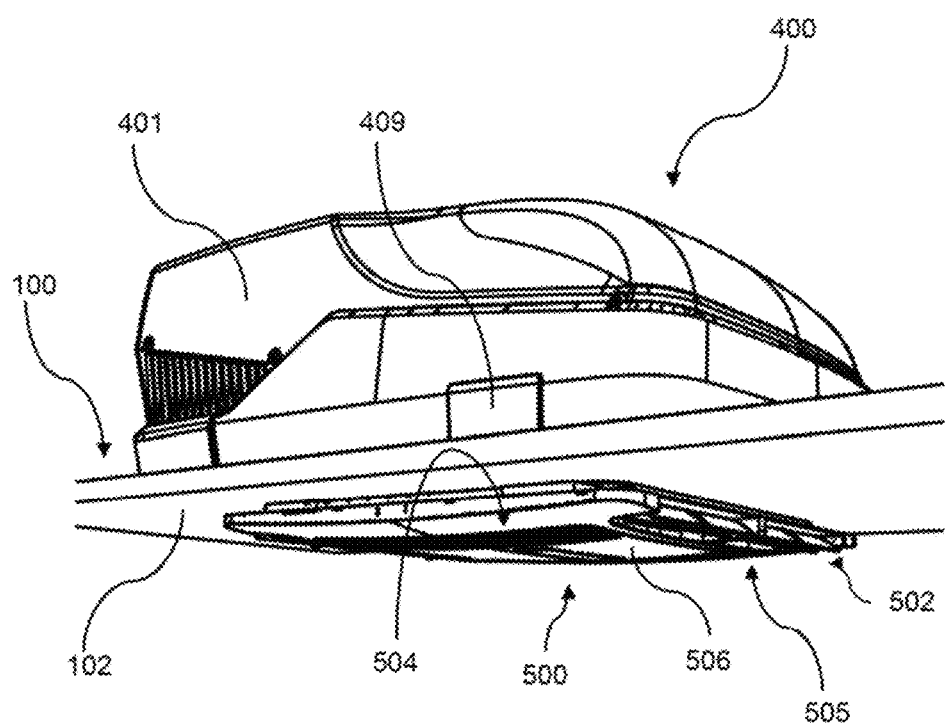
FIG. 1 illustrates a perspective view from obliquely below of an assembled modular climatization system according to an embodiment.

In FIG. 1, a mounted version of the modular climatization system is shown with both the air conditioning unit 400 and the air distribution unit 500 being mounted. The air conditioning unit 400 is mounted outside the recreational vehicle, i.e. at the roof 100 of the recreational vehicle. The air conditioning unit 400 has a rigid outer cover 401 that protects the inside from environmental influences. The outer cover 401 has an aerodynamic shape. Further at the outside of the air conditioning unit 400 a cover covering one or more connection ports 409 are shown by which it is possible to connect external devices and/or to connect the air conditioning unit 400 to an external source of energy.

The roof 100 is illustrated as a flat board. However, typical shapes of roofs 100 of recreational vehicles are also compatible with the modular climatization system. Below the roof 100 at the ceiling 103, the air distribution unit 500 is mounted. Conditioned air is released at the air outlet 505 provided with air deflecting elements 502 at a side of the air distribution unit 500. The air distribution unit 500 is rather flat shaped in order to occupy less space inside the recreational vehicle. The conditioned air is released substantially horizontally along the ceiling 103 which is controlled by the air deflecting elements 502.

In a region near the center of the air distribution unit 500, air inside the recreational vehicle is sucked in via the air inlet 504. At the air inlet 504, a filter cover 506 is provided that prevents dust or other particles from entering the air conditioning unit 400. The inside air is sucked substantially vertically upwards in order to prevent that the released conditioned air immediately re-enters the air conditioning unit 400.

Figure 2:
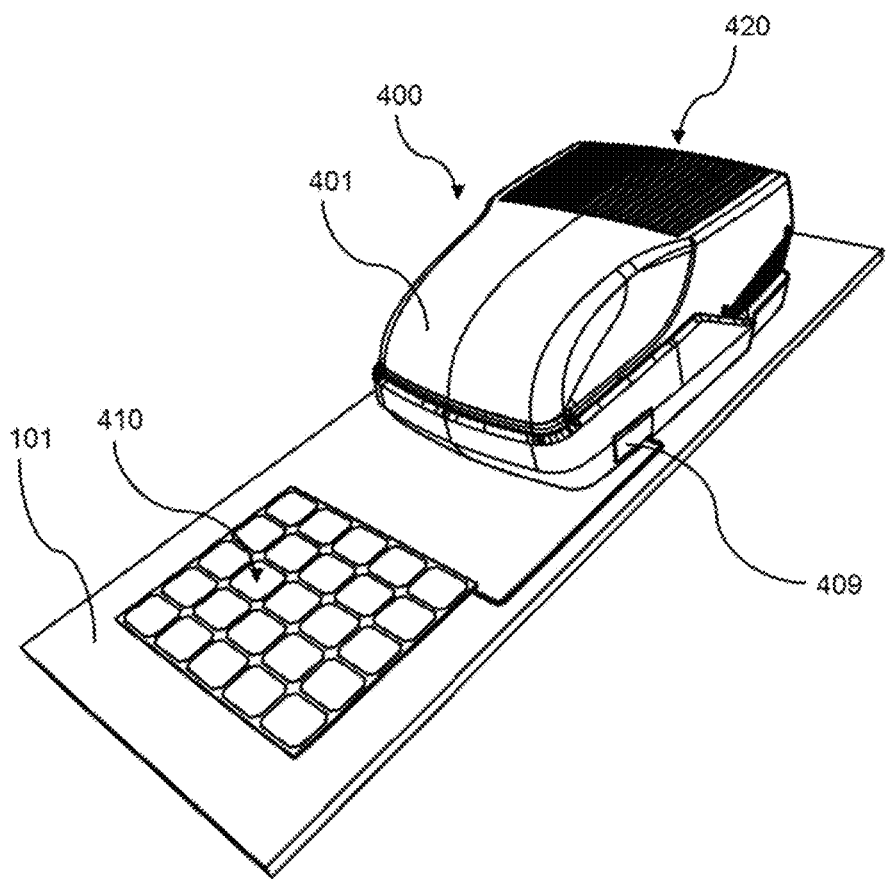
FIG. 2 illustrates a perspective view from obliquely above of the assembled modular climatization system of FIG. 1 with a solar panel.

In FIG. 2, the mounted modular climatization system of FIG. 1 is shown from above. The air conditioning unit 400 comprises a plurality of air vents 420 that provide for an effective heat exchange. As one possible external device that can be connected to the connection port 409, a solar panel 410 is exemplarily shown. The solar panel 410 is fixed at the outer roof surface 101 in front of the air conditioning unit 400 in the driving direction.

Figure 3:
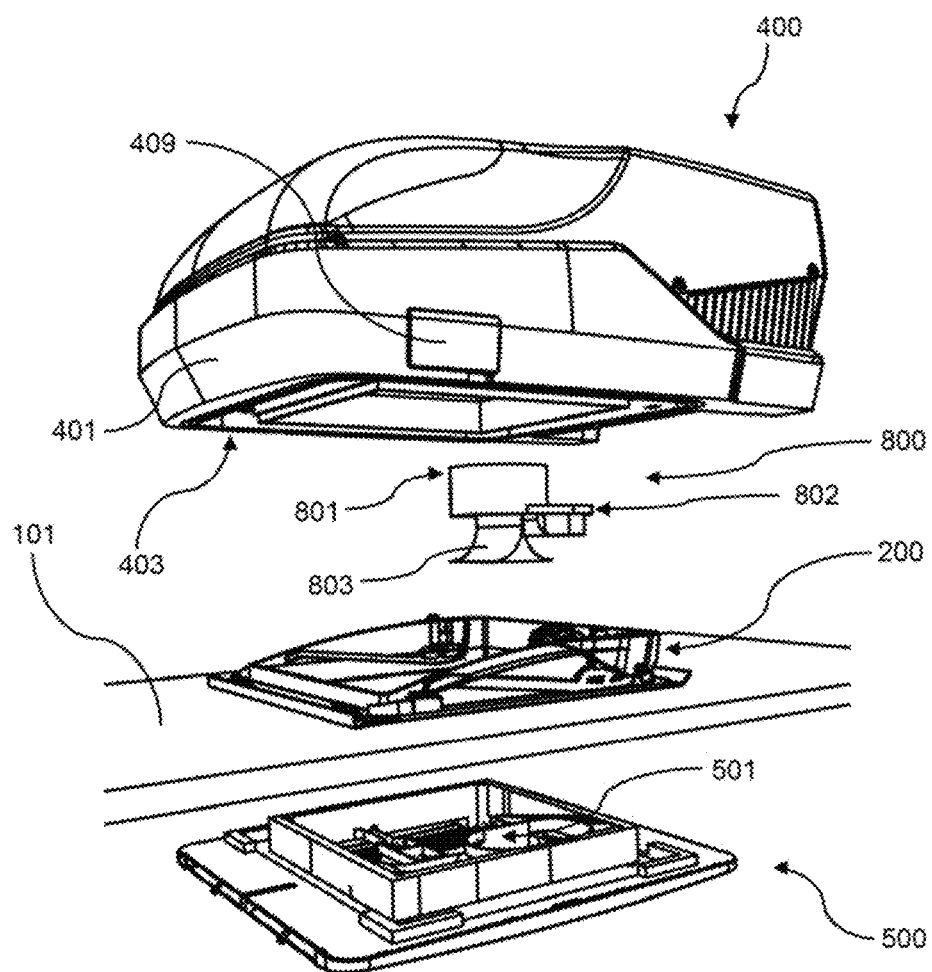
FIG. 3 illustrates an exploded view of the modular climatization system of FIG. 1.
Figure 4:
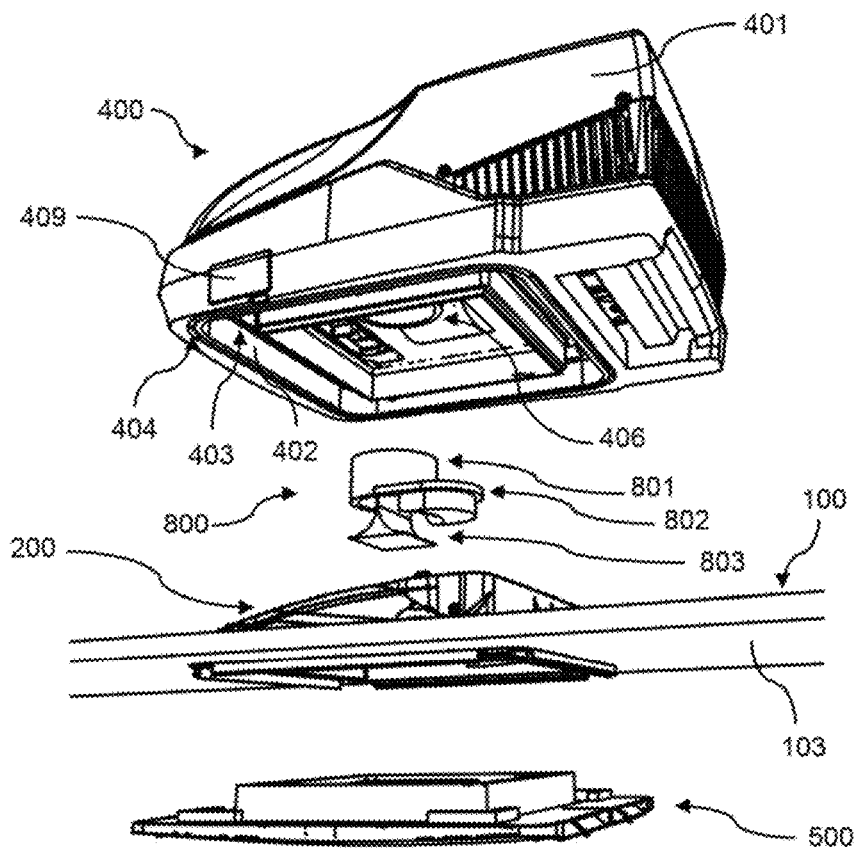
FIG. 4 illustrates another exploded view of the modular climatization system of FIG. 1.

FIGS. 3 and 4 both show an exploded view of the modular climatization system of FIGS. 1 and 2. At the underside of the air conditioning unit 400, the gasket 404 surrounds the area of the opening of the roof 100. The gasket in this embodiment is of a flexible sealing material that is placed within a groove 419. Furthermore, the circumferential or peripheral cavity 403 lies concentrically with the gasket 404 at the underside of the air conditioning unit 400. In the cavity 403, space is provided for accommodating the mounting frame 200, particularly the upper component 206 of the mounting frame 200, which will be explained further below. The cavity 403 includes abutting portions that abut against the mounting frame 200 in order to secure the air conditioning unit 400 from lateral movement, i.e. in a direction in the plane defined by the opening 201 of the mounting frame 200.

Further, in the area enclosed by the cavity 403, the first pipe section 406 of the air conditioning unit 400 protrudes vertically downwards and provides an air flow path for the released conditioned air into the inside of the recreational vehicle.

The further component in the direction of the air flow path downwards is the adapter 800. The adapter 800 has on its upper side the third pipe section 801 which fits with the first pipe section 406 of the air conditioning unit 400. Further below, the adapter 800 has the fourth pipe section 802 and the air stream divider 803. Independent from the actual design of the adapter 800, in this embodiment, the adapter 800 is made as a one-piece plastic component. This has the advantage that air cannot leak. Due to manufacturing aspects, however, it may also be valuable on a case-by-case basis that the adapter 800 is composed of several pieces.

The adapter 800 is further connected via its fourth pipe section 802 with the air distribution unit 500, thereby completing the air flow path to the inside of the recreational vehicle. In the present embodiment, the second pipe section 501 of the air distribution unit 500 is not of such a circular shape the first pipe section 406 is. Therefore, the adapter 800 is rather asymmetrically shaped. In a mounted state, the fourth pipe section 802 engages with the second pipe section 501 and the air stream divider 803 immerses into the air distribution unit 500.

The air distribution unit 500 and the mounting frame 200 are designed in a way that, analogously to the air conditioning unit 400, the air distribution unit 500 can be sort of plugged onto the mounting frame 200 thereby preventing the air distribution unit 500 from lateral movement with respect to the mounting frame 200.

Figure 5:
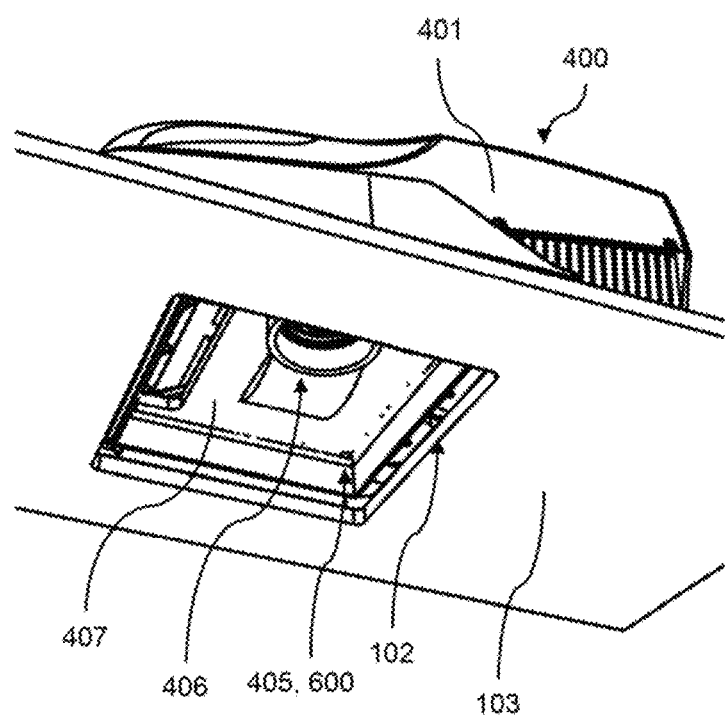
FIG. 5 illustrates a perspective view from below of the air conditioning unit of the modular climatization system of FIG. 1 placed on a roof cut-out.

In FIG. 5, the bottom side of the air conditioning unit 400 is illustrated when seen through the roof cut-out 102. The first pipe section 406 and the base plate 407 are integrally formed as a one-piece component. Furthermore, fixing means 405 are provided in the area of the roof cut-out 102 or, more precisely, in the area of the opening 201 of the mounting frame 200. The fixing means 405 are present at the base plate 407 and are represented by bores 600. The bores 600 extend vertically so that the air distribution unit 500 can be fixed with screws 601 vertically through the opening 201 as will be described further below.

Figure 6:
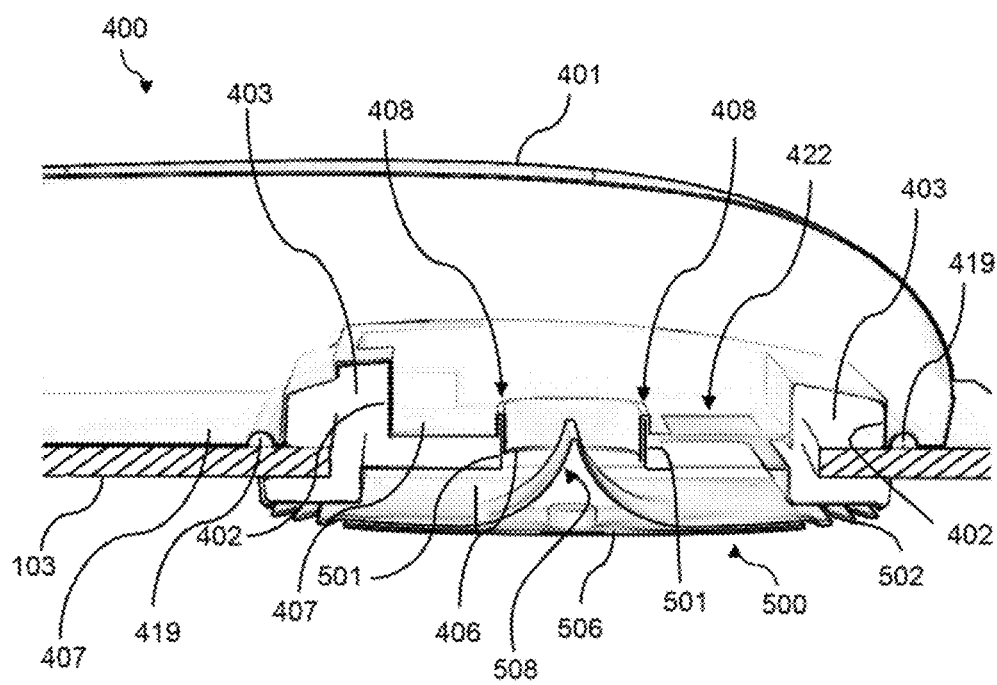
FIG. 6 illustrates a lengthwise cross-sectional view through an air conditioning unit and an air distribution unit according to another embodiment.

FIG. 6 displays a lengthwise cross-section through the air conditioning unit 400 and illustrates the air distribution unit 500 according to another embodiment. For a better overview, in FIG. 6 the mounting frame 200 is not shown. Furthermore, in FIG. 6 also the interior of the air conditioning unit 400 is left aside. Starting with the air conditioning unit 400, the concentric arrangement of the groove 419 for the gasket 404, the cavity 403 for accommodating the upper component 206 of the mounting frame 200 and the first pipe section 406 can be seen, all of which are formed together with the base plate 407 as one integral component. The cavity 403 includes substantially vertical walls serving as the abutting portions 402. Besides the first pipe section 406, a further opening 422 is provided in the base plate 407 and, corresponding thereto, in the air distribution unit 500 through which a further air flow path reaches for the air sucked in by the air conditioning unit 400.

At the transition from the base plate 407 to the first pipe section 406, the recess 408 accommodates the second pipe section 501 of the air distribution unit 500. The air distribution unit 500 is located at the ceiling 103 and is fixed to the air conditioning unit 400, while in FIG. 6 the respective fixing means are not shown either. The air distribution unit 500 includes the filter cover 506. The air stream dividing portion 508 of the air distribution unit 500 is located with its tip reaching through the second pipe section 501 and guides the conditioned air towards the air deflecting elements 502. Also, not shown in FIG. 6 are the means for providing the air flow path that is sucked in the air conditioning unit 400 through the base plate opening 422. The air flow paths through the first and second pipe sections 406 (FIG. 4), 501 are separate from each other.

Figure 7:
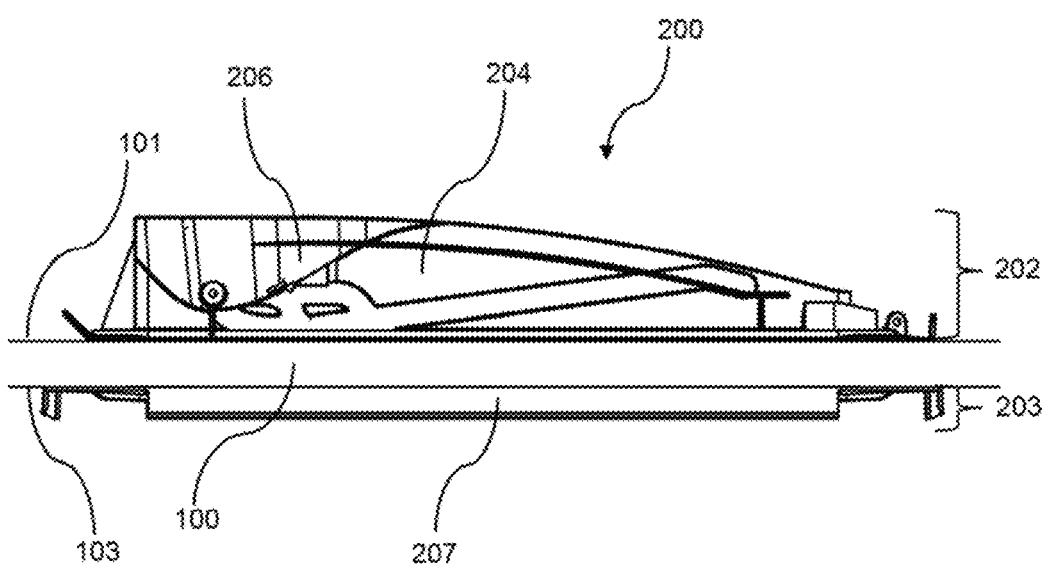

In FIG. 7, a side view of the mounting frame 200 in the mounted state is shown. The outward facing side 202 of the mounting frame 200 is located at the outer roof surface 101 and the inward facing side 203 of the mounting frame 200 is located at the ceiling 103. At the upper component 206 of the mounting frame 200 is the first wall part 204. The lower component 207 also serves as securing means against lateral displacement of the air distribution unit 500 with respect to the mounting frame 200. The upper component 206 of the mounting frame 200 is, however, further designed to be connected, for example pivotally connected with the window 300, for example, via hinge pins 303 (shown in FIG. 11).

Figure 8:
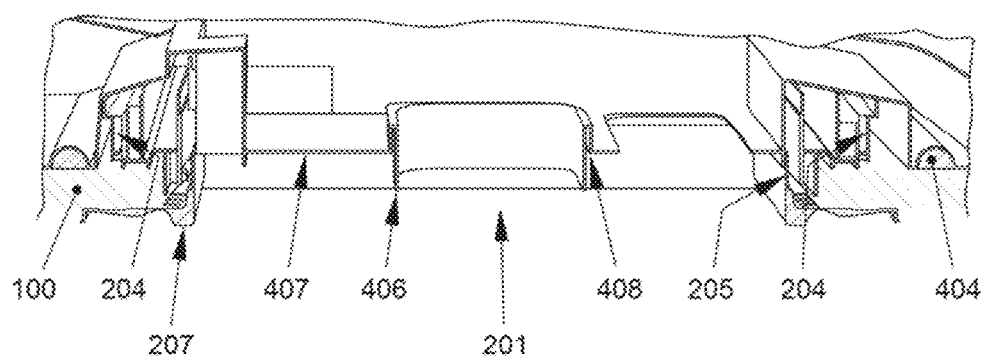
FIG. 8 illustrates a lengthwise cross-sectional view through a mounting frame and a part of the air conditioning unit according to the embodiment shown in FIG. 6.

FIG. 8 illustrates the mounting frame 200 together with a part of the air conditioning unit 400 in a cross-sectional view. In FIG. 8 the first wall part 204 and the second wall part 205 are visible both representing substantially vertical elements. The wall parts 204 and 205 are designed to correspond to and to abut against the abutting portions 402 of the air conditioning unit 400. In the illustrated embodiment, the first wall part 204 is provided at the upper component 206 and the second wall part 205 is provided at the lower component 207 of the mounting frame 200. The first pipe section 406 reaches halfway through the opening 201, i.e. through about half of the thickness of an average roof 100.

Figure 9:
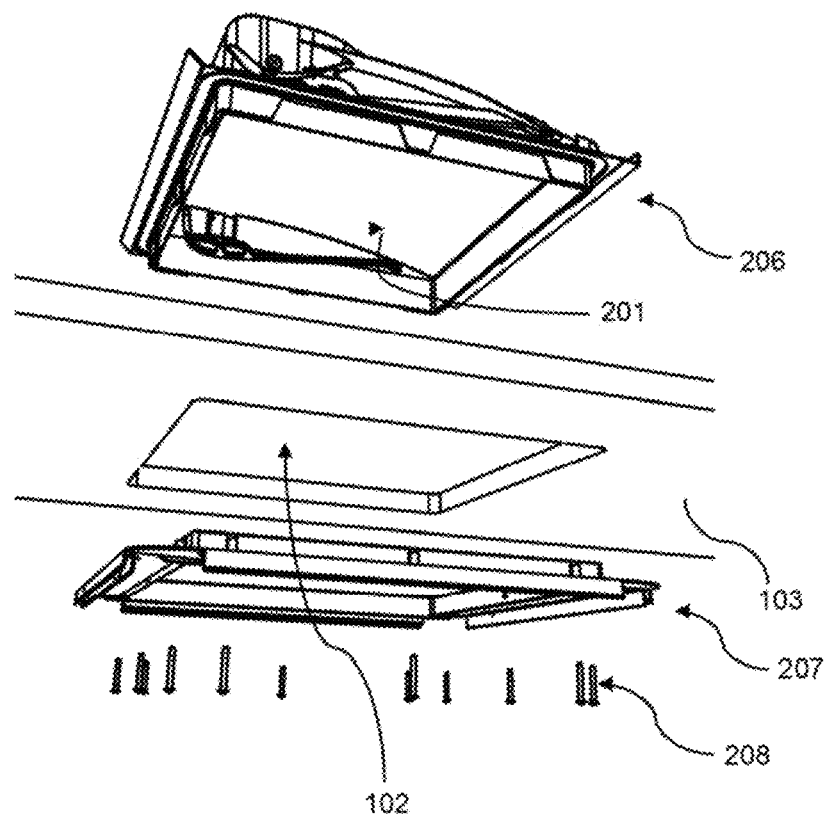
FIG. 9 illustrates an exploded view from below of the mounting frame shown in FIG. 7.

In FIG. 9, an exploded view of the mounting frame 200 is shown. Upper component 206 and lower component 207 of the mounting frame 200 are fastened to each other by a plurality of screws 208. The opening 201 defined by the mounting frame 200 is slightly smaller than the roof cut-out 102. Thus, the screws 208 for coupling the upper and lower components 206 and 207 of the mounting frame 200 reach through the roof cut-out 102 and do not need to perforate the roof 100.

In FIGS. 10 to 15, a method of replacing the window 300 with the air conditioning unit 400 and the shading unit 700 with the air distribution unit 500, respectively, is exemplarily illustrated. First the window 300 is present at the outer roof surface 101, indicated as step S0 of FIG. 10.

Figure 10:
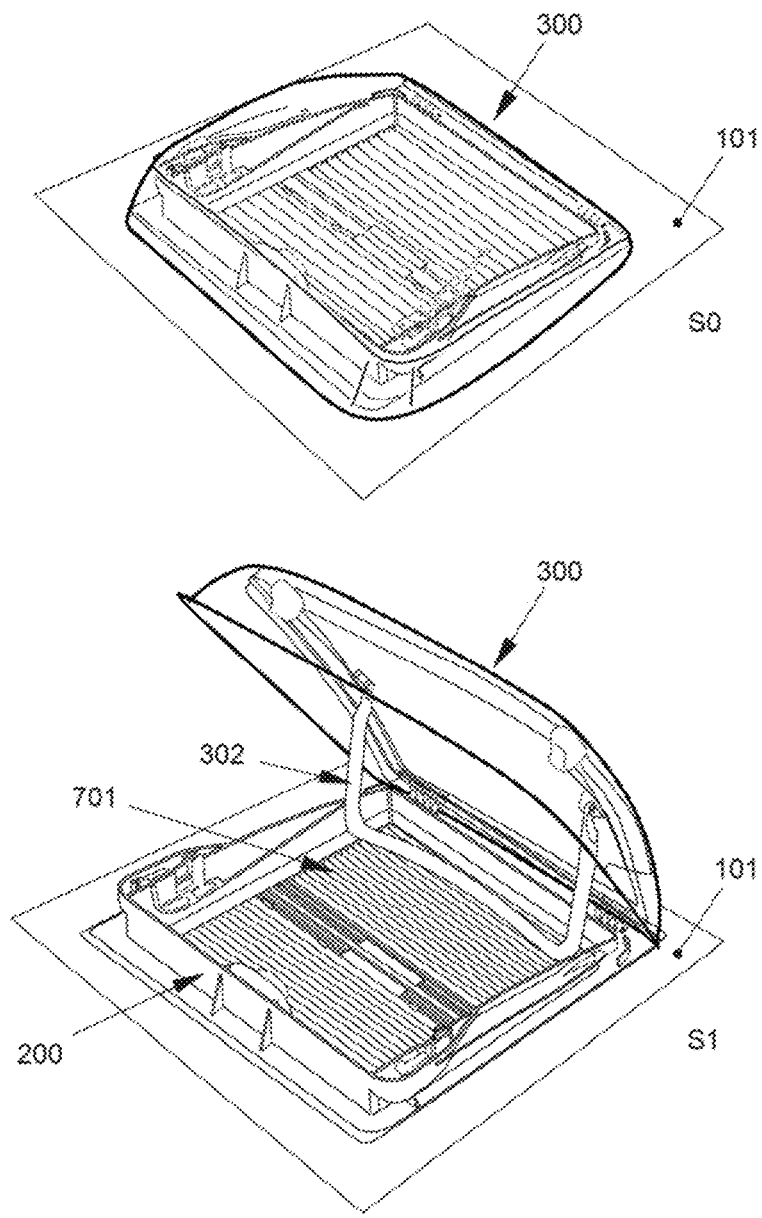
FIG. 10 illustrates steps of replacing a window with an air conditioning unit.

In step S1 of FIG. 10, the window 300 is opened by means of the handle 302. The handle 302 functions at the same time as window casement stays. Through the opened window, the blinds 701 of the shading unit 700 are visible and the opened window reveals the mounting frame 200.

Figure 11:
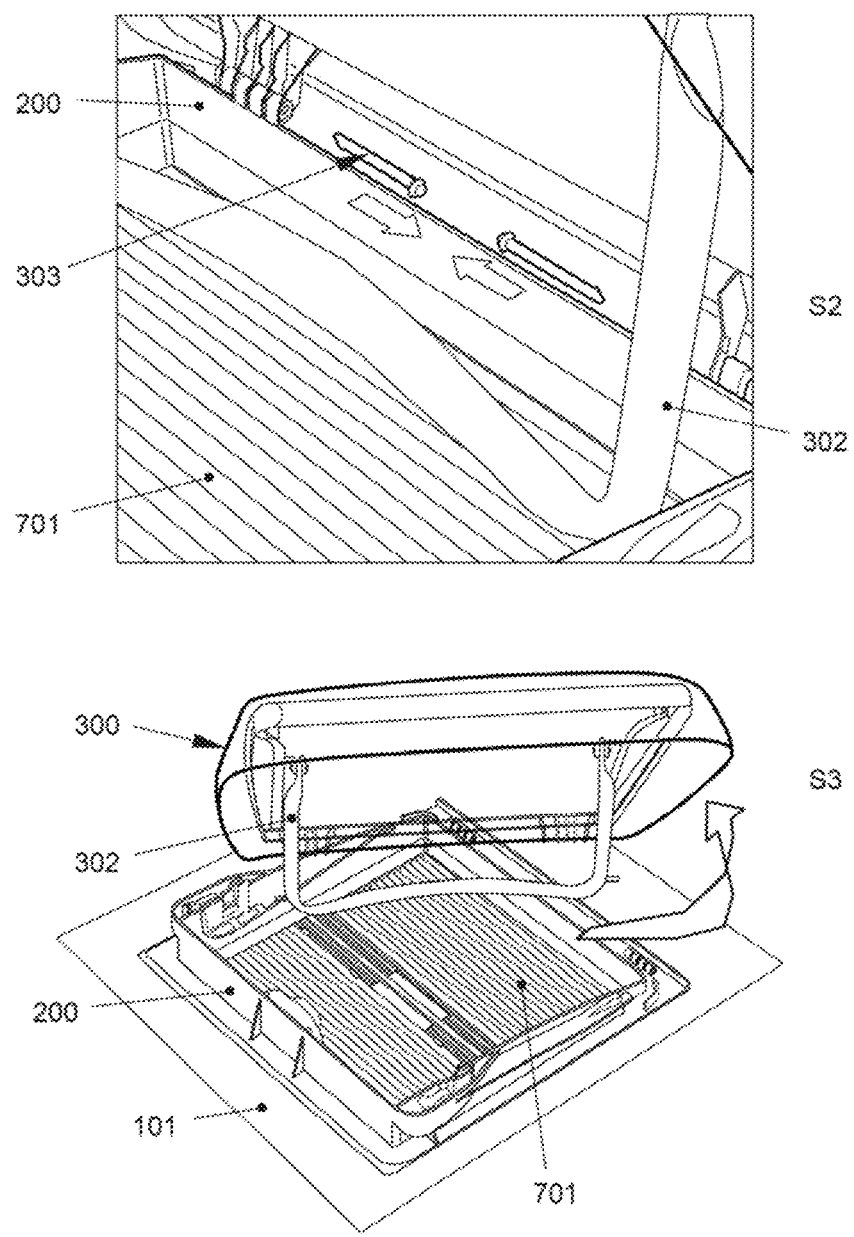
FIG. 11 illustrates steps of replacing a window with an air conditioning unit.

In step S2 of FIG. 11, the connection of the window 300 with the mounting frame 200 is disengaged by removing the hinge pins 303. Thus, the window 300 can be removed in step S3. In this embodiment, the window 300 can be removed by a rotational movement as indicated by the bold arrow in S3 of FIG. 11.

Figure 12:
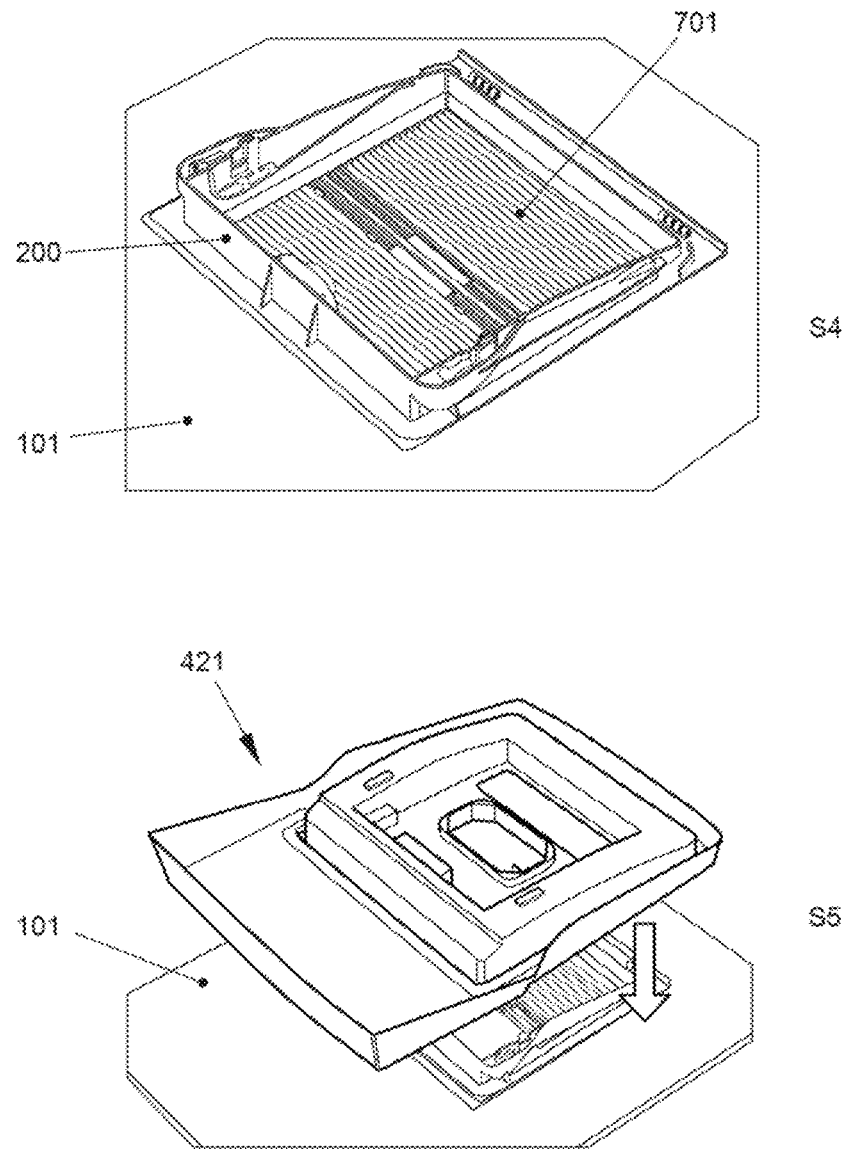
FIG. 12 illustrates steps of replacing a window with an air conditioning unit.

In S4 of FIG. 12, the mounting frame 200 with the window 300 being removed is shown and subsequently thereto, in S5 of FIG. 12, the base pan 421 of the air conditioning unit 400 is placed over the mounting frame 200. In this embodiment of the air conditioning unit 400, the base pan 421 is a one-piece component that includes the entire lower part of the outer cover 401 of the air conditioning unit 400, including the base plate 407, the groove 419, the cavity 403 and the first pipe section 406.

Figure 13:
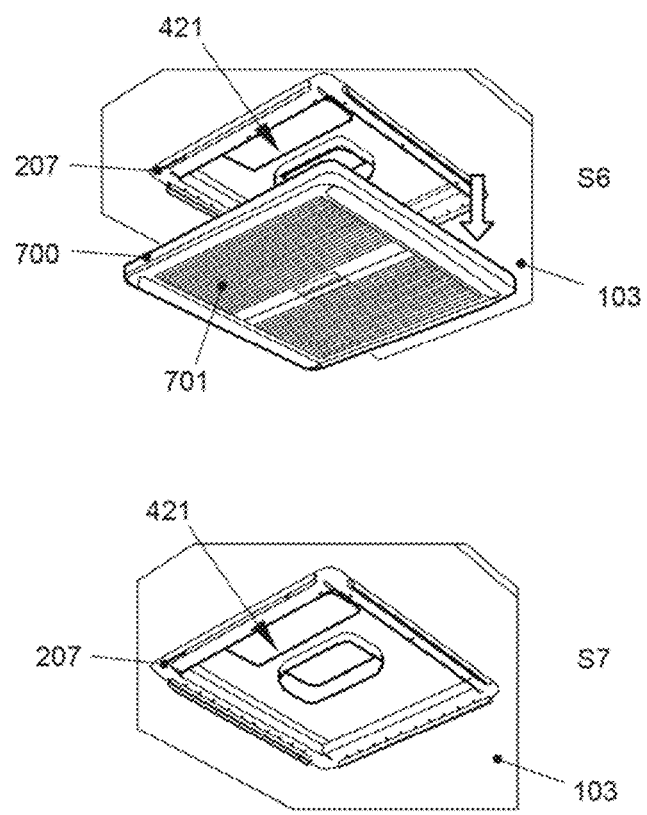
FIG. 13 illustrates steps of replacing a shading unit with an air distribution unit.

In S6 of FIG. 13 it is turned to the inside of the recreational vehicle and the removal of the shading unit 700 is shown, revealing the lower component 207 of the mounting frame 200. A part of the base pan 421 is visible through the opening 201. In S7 of FIG. 13, the mounting frame 200 with the shading unit 700 being removed is illustrated.

Figure 14:
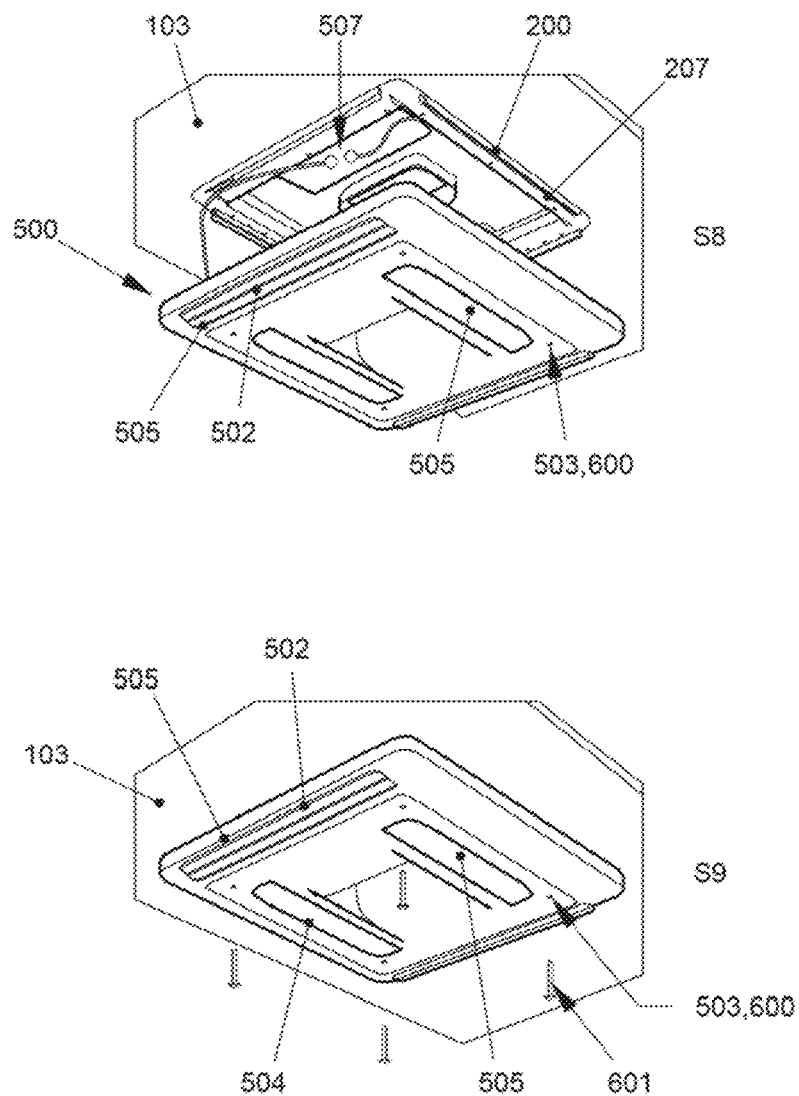
FIG. 14 illustrates steps of replacing a shading unit with an air distribution unit.
Figure 15:
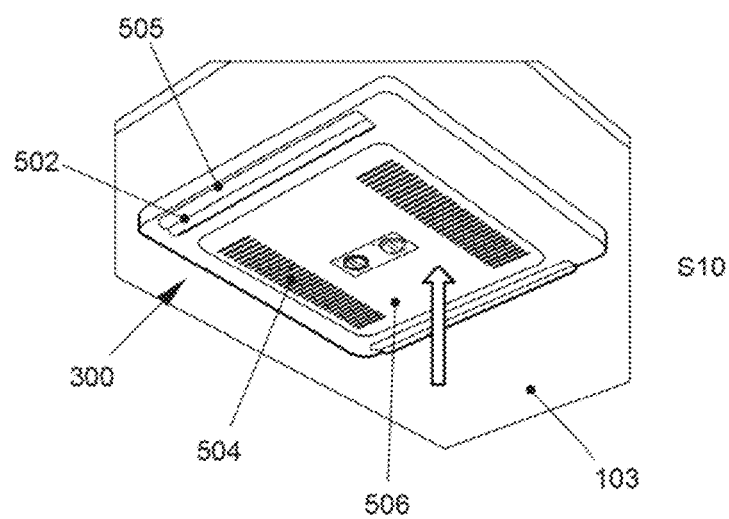
FIG. 15 illustrates a step of replacing a shading unit with an air distribution unit.

Finally, as shown in S8 and S9 of FIG. 14, the air distribution unit 500 is mounted to the air conditioning unit 400. First, the cable connection 507 between the air distribution unit 500 and the air conditioning unit 400 is established (see S8). Then, the air distribution unit 500 is placed over the lower component 207 of the mounting frame 200, followed by fixing the air distribution unit 500 with screws 601 through the bores 600 to the air conditioning unit 400. In the center of the air distribution unit 500, the underside of the air stream dividing portion 508 can be seen which, in S10 of FIG. 15 is finally covered by the filter cover 506.

Figure 16:
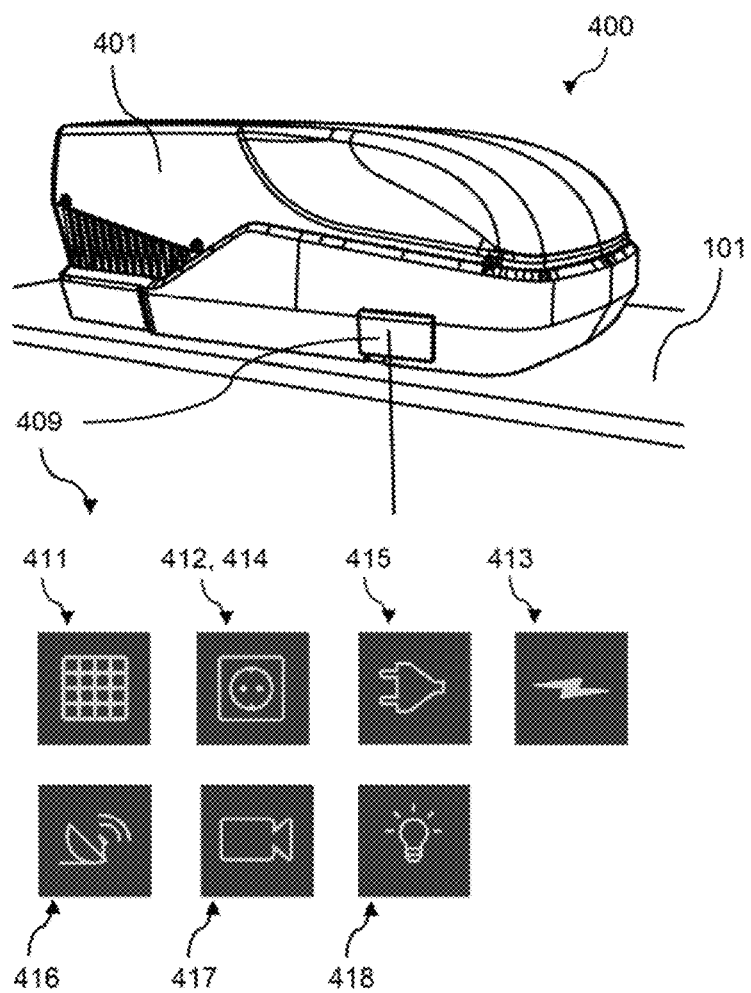
FIG. 16 illustrates a perspective view of an air conditioning unit with a connection port and different options for connection ports.

With reference to FIG. 16, the connection port 409 is now explained in more detail. On a side of the outer cover 401 of the air conditioning unit 400 the connection port 409 is or the connection ports 409 are present near the outer roof surface 101. The connection ports 409 are coupled via the air conditioning unit 400 with a wire or wirelessly to the inside of the recreational vehicle, advantageously with a control interface (not shown) or with a power source. Additionally, a connection port may be just a cable to supply energy to the air conditioning unit 400.

The connected external device can be any suitable device. As exemplarily shown in FIG. 16, the connection ports 409 include a socket 412 for providing direct current.

According to another embodiment or additionally, the connection ports 409 include an inverter 413 and a socket 414 for providing alternating current.

According to another embodiment or additionally, the connection ports 409 include a plug 415 for plugging the air conditioning unit 400 to an external source of electricity.

According to another embodiment or additionally, the connection ports 409 include a solar panel connection port 411. This embodiment is already described above with reference to FIG. 2. The solar panel 410 is simply plugged in the connection ports 409 of the air conditioning unit 400.

According to another embodiment or additionally, the connection ports 409 include an antenna connection port 416. In this embodiment, an antenna, like a satellite dish, is placed on the roof 100 as usual and simply has to be plugged in the air conditioning unit 400

According to another embodiment or additionally, the connection ports 409 include a camera connection port 417. A camera can be plugged in the connection ports 409 at the air conditioning unit 400. The camera is thus supplied with electricity and can transfer its data via the air conditioning unit 400 to a receiving device (not shown) like the aforementioned interface (not shown).

According to another embodiment or additionally, the connection ports 409 include an external light connection port 418. Thereby, a light can be plugged in the connection ports 409 at the air conditioning unit 400. Preferably, the light intensity can be controlled via the interface (not shown).

Figure 17:
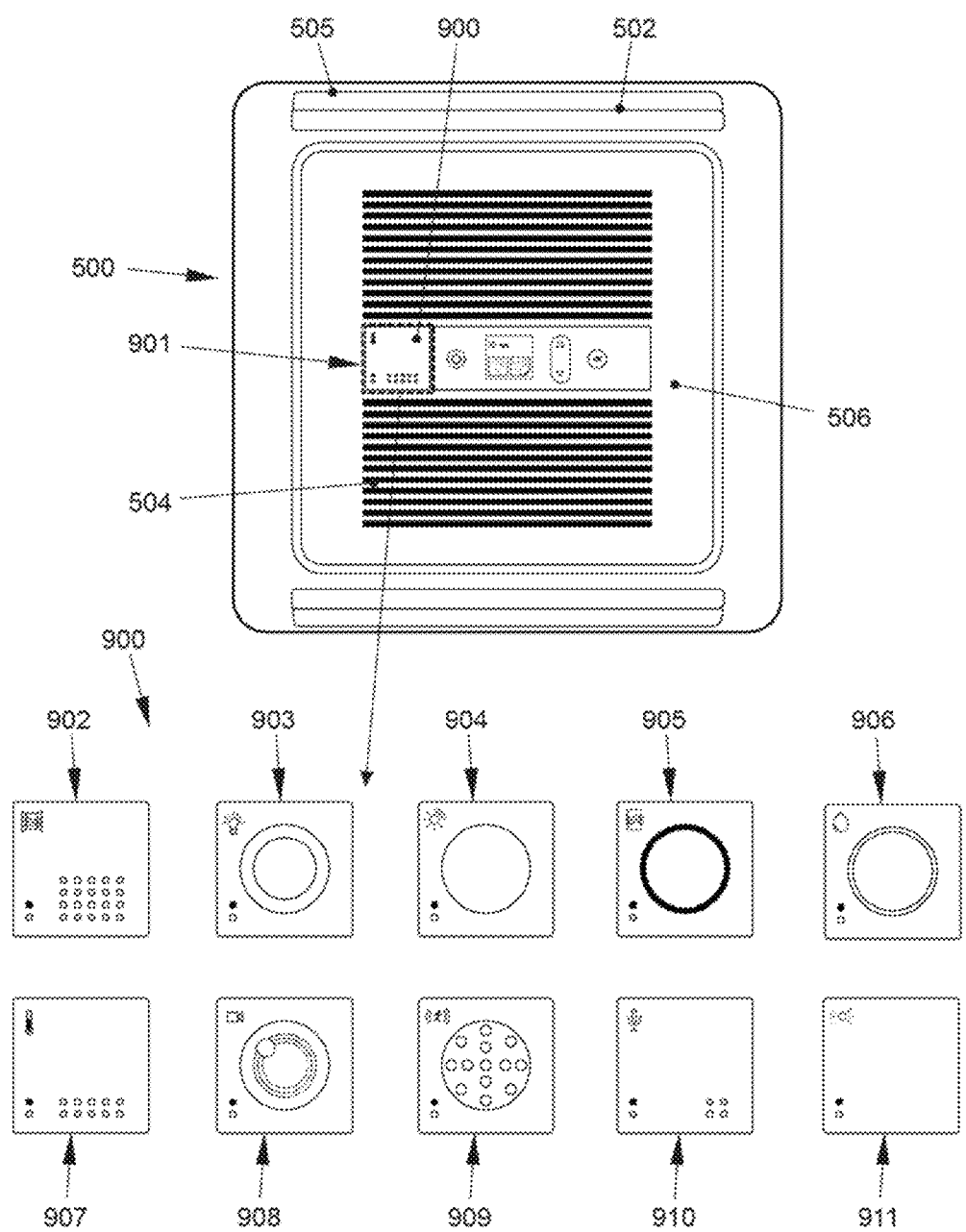
FIG. 17 illustrates a plan view onto an air distribution unit with an attachment portion for a module and several examples of modules.

In FIG. 17, a component part being the air distribution unit 500 is shown having the attachment portion 901 at the filter cover 506 aside the slots for the air inlet 504. The attachment portion in FIG. 17 is capable of attaching one module 900 which can be selected from a number of different modules 900. The module 900 to be connected to the air distribution unit 500 is clipped in at the attachment portion 901 by the user. The attachment portion 901 is equipped with a clip-fix or snap-in mechanism (not show) with which fixing and removing is easy to achieve.

Depending on what is currently needed, a module 900 can be selected from a temperature sensor 907, a pressure sensor 902, a camera 908, a motion sensor 909, a light sensor 904, a microphone 910, an air quality sensor, in particular a smoke sensor 905, a humidity sensor 906, a vibration sensor 911, a light source 903 and a speaker (not shown).

Each one of the sensors measuring certain events or parameter changes inside the recreational vehicle, like the temperature, can send the respective information to an external device (not shown) or to an interface (not shown).

Figure 18:
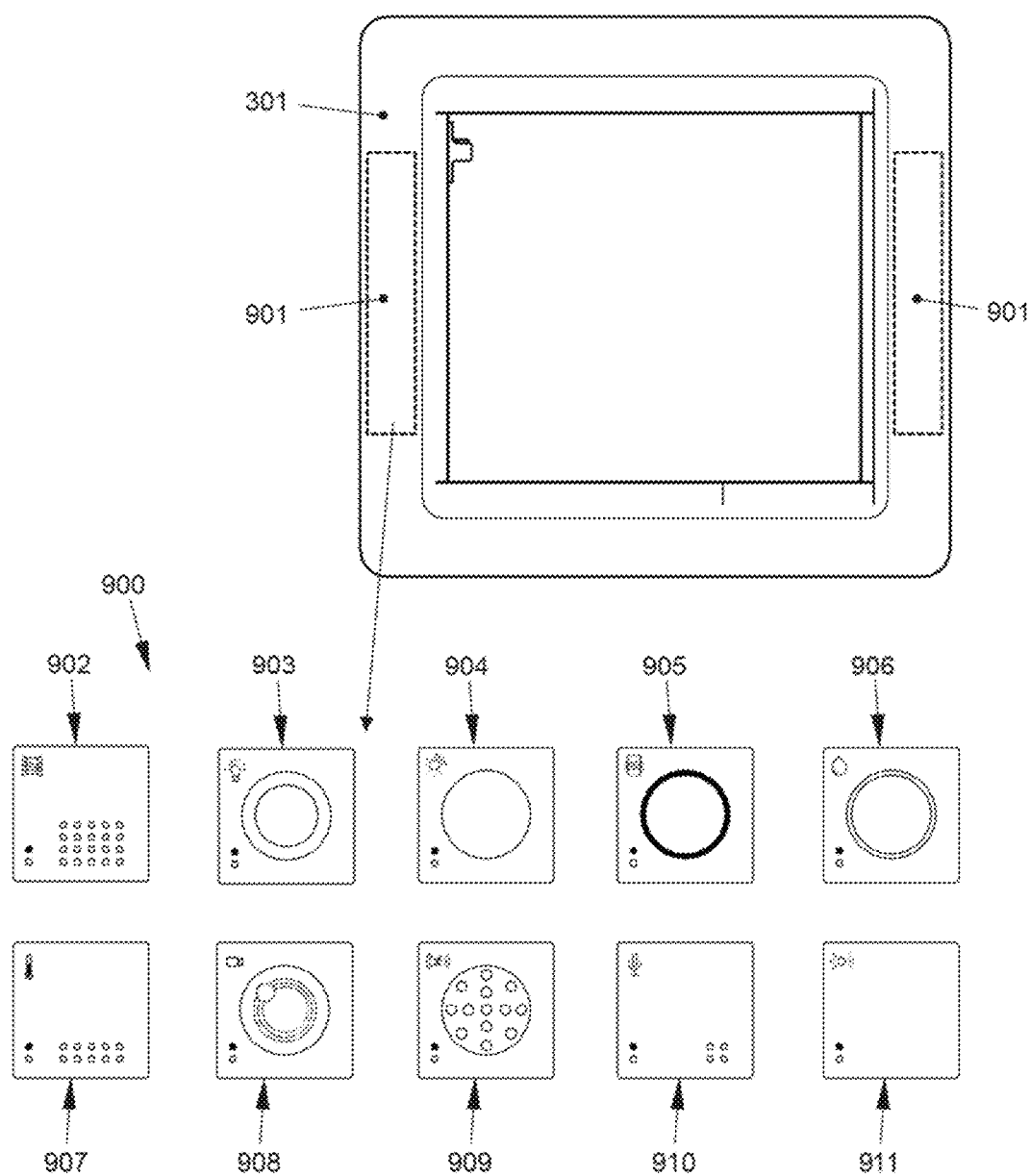
FIG. 18 illustrates a plan view onto a decorative window frame with a plurality of attachment portions for modules and the examples of modules as shown in FIG. 17.

In FIG. 18, the decorative window frame 301 is shown as the component part being equipped with the modules 900. In comparison with the air distribution unit 500 of FIG. 17, the window frame 301 has a plurality of such attachment portions 901 being illustrated by the dashed rectangles. Thereby, next to one, preferably a plurality of modules, e.g. two, three, four, five, six, seven or eight modules can be attached to the window frame 301 at the same time. Of course, there is no difference or limitation in selecting the modules 900 in comparison with the air distribution unit 500 as the component part equipped with the attachment portions 901.

Regardless of which part is the component part being equipped with the removably and exchangeably connected modules 900, the attachment portions 901 are equipped with electric contacts to provide power to the modules 900. As such, the modules 900 do not need a battery. In an advanced embodiment, the modules 900 are supplied with power from the same power source the air conditioning unit 400 has. Here, electric power is supplied via the mounting frame 200 to the air conditioning unit 400 and via the air conditioning unit 400 to the air distribution unit 500 or the decorative window frame 301, respectively, and to each attachment portion 901 present thereon. Alternatively, the power can be supplied directly from the mounting frame 200 to the air distribution unit 500 or the decorative window frame 301, respectively, and to each attachment portion 901 present thereon. In some examples, the attachment portions 901 for the modules 900 provide both power supply and signal transmission. For this purpose, electronic circuits for the signal transmission from and to the modules 900 are provided within the modular system, in particular, within the air distribution unit 500, the decorative window frame 301 and the mounting frame 200.

REFERENCE NUMERALS 100 roof
101 outer roof surface
102 roof cut-out
103 ceiling
200 mounting frame
201 opening
202 outward facing side of the mounting frame
203 inward facing side of the mounting frame
204 first wall part
205 second wall part
206 upper component
207 lower component
208 screws (for assembling the mounting frame)
300 window
301 decorative window frame
302 handle
303 hinge pin
400 air conditioning unit
401 outer cover
402 abutting portion
403 cavity
404 gasket
405 fixing means at the air conditioning unit
406 first pipe section
407 base plate
408 recess
409 connection port
410 solar panel
411 solar panel connection port
412 socket DC
413 Inverter
414 socket AC
415 plug
416 antenna connection port
417 camera connection port
418 external light connection port
419 groove
420 air vents
421 base pan
422 opening in the base plate
500 air distribution unit
501 second pipe section
502 air deflecting elements
503 fixing means at the air distribution unit
504 air inlet
505 air outlet
506 filter cover
507 cable connection
508 air stream dividing portion
600 bore
601 screw
700 shading unit
701 blind
800 adapter
801 third pipe section
802 fourth pipe section
803 air stream divider
900 module
901 attachment portion
902 pressure sensor
903 light source
904 light sensor
905 smoke sensor
906 humidity sensor
907 temperature sensor
908 camera
909 motion sensor
910 microphone
911 vibration sensor

The invention claimed is:

1. A modular climatization system for a recreational vehicle, comprising:
a mounting frame and a window, wherein the mounting frame defines and lies in a horizontal plane, the mounting frame is mountable into a roof cut-out of a roof of the recreational vehicle, thereby defining an opening in the roof of the recreational vehicle, the mounting frame being distinct from and mountable to the roof and having an outward facing side that extends outward from the roof cut-out and an inward facing side that extends inwardly from the roof cut-out with respect to the recreational vehicle, and the window having a transparent portion wherein the window is mountable to the outward facing side of the mounting frame and removable from said mounting frame, wherein the modular climatization system further comprises an air conditioning unit and an air distribution unit, the air conditioning unit being mountable to the outward facing side of the mounting frame and removable from said mounting frame, wherein the window and the air conditioning unit are mountable to the mounting frame in a mutually exchangeable manner, and the air distribution unit being mountable to the inward facing side of the mounting frame.

2. The modular climatization system according to claim 1, wherein the modular climatization system further comprises a fan module for forced ventilation mountable to the outward facing side of the mounting frame, wherein the window, the air conditioning unit and the fan module are mountable to the mounting frame in a mutually exchangeable manner.

3. The modular climatization system according to claim 2, wherein the air conditioning unit or the window or the fan module include an antenna located underneath an outer cover of the air conditioning unit or underneath the window or underneath the outer cover of the fan module, respectively.

4. The modular climatization system according to claim 1, wherein the modular climatization system further comprises a shading unit mountable to the inward facing side of the mounting frame, wherein the air distribution unit and the shading unit are mountable to the mounting frame in a mutually exchangeable manner.

5. The modular climatization system according to claim 1, wherein the mounting frame comprises securing means for securing the air conditioning unit from moving with respect to the mounting frame in a direction within the horizontal plane of the mounting frame, the securing means include a first wall part that is arranged at least in part around the opening and projects in a direction substantially perpendicular to the horizontal plane of the mounting frame.

6. The modular climatization system according to claim 5, wherein the first wall part is arranged completely around the opening.

7. The modular climatization system according to claim 5, wherein the securing means includes a second wall part that is arranged in parallel to the first wall part.

8. The modular climatization system according to claim 7, wherein the first wall part and the second wall part are concentrically arranged around the opening.

9. The modular climatization system according to claim 7, wherein the air conditioning unit has at least one abutting portion that is configured to abut against one of the first wall part, the second wall part, or both, of the mounting frame in a direction within the horizontal plane of the mounting frame, in a mounted state.

10. The modular climatization system according to claim 1, wherein the air conditioning unit comprises structure for air conditioning and heating.

11. The modular climatization system according to claim 1, wherein the air conditioning unit has a cavity on its bottom side that, in a mounted state, faces the mounting frame for accommodating and enclosing from above the outward facing side of the mounting frame that projects to the above from an outer roof surface of the roof of the recreational vehicle.

12. The modular climatization system according to claim 11, wherein the air conditioning unit further comprises a gasket on its bottom side that surrounds the cavity and that is configured to provide for a sealing with the outer roof surface of the roof of the recreational vehicle.

13. The modular climatization system according to claim 1, wherein the air distribution unit is fixable to the air conditioning unit via corresponding fixing structure at the air distribution unit and at the air conditioning unit, thereby clamping the mounting frame between the air distribution unit and the air conditioning unit.

14. The modular climatization system according to claim 13, wherein the fixing structure at the air distribution unit and at the air conditioning unit are located in the area of the opening.

15. The modular climatization system according to claim 13, wherein the fixing structure at the air distribution unit and at the air conditioning unit comprise bores and, in a mounted state, the air distribution unit is fixed to the air conditioning unit via the bores by bolts or screws.

16. The modular climatization system according to claim 13, wherein no further fixing means are comprised by the modular climatization system for fixing the air conditioning unit or the air distribution unit to the mounting frame.

17. The modular climatization system according to claim 1, wherein the air conditioning unit comprises a first pipe section located at the bottom side of the air conditioning unit in the area of the opening and, in a mounted state, projecting vertically downwards to the air distribution unit to provide an air flow path to the air distribution unit.

18. The modular climatization system according to claim 17, wherein the air conditioning unit comprises a base plate on its bottom side and the first pipe section is integrally formed with the base plate and projects, in a mounted state, vertically downwards from the base plate.

19. The modular climatization system according to claim 18, wherein the air distribution unit comprises a second pipe section that is configured to fit with the first pipe section, either via an adapter in between the first and second pipe section or directly, in a telescopic manner, thereby forming part of the air flow path.

20. The modular climatization system according to claim 19, wherein the first pipe section and the second pipe section directly fit and can be moved telescopically with respect to each other, so that the distance between the air conditioning unit and the air distribution unit is variable depending on the thickness of the roof of the recreational vehicle the modular climatization system is to be mounted on.

21. The modular climatization system according to claim 20, wherein the first pipe section is smaller than the second pipe section, so that, when the first pipe section and the second pipe section engage with each other, the second pipe section encloses the first pipe section.

22. The modular climatization system according to claim 21, wherein at the bottom side of the air conditioning unit, a recess is formed at a transition between the base plate and the first pipe section that surrounds the first pipe section and is dimensioned so that the second pipe section can be inserted into the recess.

23. The modular climatization system according to claim 19, wherein the first pipe section and the second pipe section fit with each other via the adapter, the adapter comprises a third pipe section that directly fits with the first pipe section at the air conditioning unit, and a fourth pipe section that directly fits with the second pipe section at the air distribution unit, thereby forming part of the air flow path.

24. The modular climatization system according to claim 23, wherein the adapter comprises an air stream divider dividing the air flow path in a first air flow path and a second air flow path.

25. The modular climatization system according to claim 24, wherein the air stream divider is located in the air flow path.

26. The modular climatization system according to claim 23, wherein in a mounted state, the air distribution unit covers the inward facing side of the mounting frame.

27. The modular climatization system according to claim 1, wherein the air distribution unit comprises a plurality of air deflecting elements.

28. The modular climatization system according to claim 1, wherein the air conditioning unit, or the window, include an antenna located underneath an outer cover of the air conditioning unit, or underneath the window, respectively.

* * * * *